(12) United States Patent
Misawa et al.

(10) Patent No.: US 9,690,393 B2
(45) Date of Patent: Jun. 27, 2017

(54) INFORMATION PROCESSING DEVICE, PROGRAM, RECORDING MEDIUM, AND INFORMATION PROCESSING SYSTEM

(75) Inventors: Junichiro Misawa, Nagano (JP); Yoshio Ito, Tochigi (JP); Hiroshi Katayama, Nagano (JP)

(73) Assignee: SONY CORPORATION, Tokyo (JP)

( * ) Notice: Subject to any disclaimer, the term of this patent is extended or adjusted under 35 U.S.C. 154(b) by 514 days.

(21) Appl. No.: 13/024,440

(22) Filed: Feb. 10, 2011

(65) Prior Publication Data

US 2011/0227881 A1 Sep. 22, 2011

(30) Foreign Application Priority Data

Mar. 17, 2010 (JP) ................................ 2010-060869

(51) Int. Cl.
G06F 3/0354 (2013.01)
G06K 9/00 (2006.01)
G06K 9/22 (2006.01)

(52) U.S. Cl.
CPC ..... *G06F 3/03545* (2013.01); *G06K 9/00402* (2013.01); *G06K 9/222* (2013.01)

(58) Field of Classification Search
CPC .............. G06F 3/0488; G06F 3/03545; G06K 9/00402–9/00436; G06K 9/222
USPC ........................................ 345/156, 168–173
See application file for complete search history.

(56) References Cited

U.S. PATENT DOCUMENTS

| | | | |
|---|---|---|---|
| 5,832,474 A | * | 11/1998 | Lopresti et al. |
| 2001/0002204 A1 | * | 5/2001 | Jebens ............... H04N 1/00132 375/240.01 |
| 2001/0024193 A1 | | 9/2001 | Fahraeus |
| 2004/0021647 A1 | | 2/2004 | Iwema et al. |
| 2004/0093565 A1 | * | 5/2004 | Bernstein et al. ............ 715/531 |
| 2005/0154707 A1 | * | 7/2005 | Napper et al. .................. 707/3 |

(Continued)

FOREIGN PATENT DOCUMENTS

| | | |
|---|---|---|
| JP | 10-055371 A | 2/1998 |
| JP | 10-268996 A | 10/1998 |

(Continued)

OTHER PUBLICATIONS

U.S. Appl. No. 12/903,604, filed Oct. 13, 2010, Misawa, et al.

(Continued)

*Primary Examiner* — Amare Mengistu
*Assistant Examiner* — Sarvesh J Nadkarni
(74) *Attorney, Agent, or Firm* — Oblon, McClelland, Maier & Neustadt, L.L.P.

(57) ABSTRACT

There is provided an information processing device which includes a receiving unit which receives handwriting data of an electronic pen accompanied by attribute information added by a user; a recognizing unit which recognizes a character string or a graphic from the handwriting data accompanied by the attribute information and associates the attribute information accompanying the handwriting data with the character string or the graphic; a search unit which searches for user-desired information on the basis of the character string or the graphic and the attribute information associated with the character string or the graphic; a converting unit which converts the user-desired information to display data; and a display unit which displays the display data.

14 Claims, 23 Drawing Sheets

(56) References Cited

U.S. PATENT DOCUMENTS

| | | | |
|---|---|---|---|
| 2007/0098263 A1 | 5/2007 | Furukawa et al. | |
| 2008/0250012 A1* | 10/2008 | Hinckley et al. | 707/5 |
| 2009/0119308 A1* | 5/2009 | Clark et al. | 707/100 |
| 2009/0309849 A1* | 12/2009 | Iwema et al. | 345/173 |
| 2010/0114916 A1* | 5/2010 | Cooke | 707/752 |

FOREIGN PATENT DOCUMENTS

| | | |
|---|---|---|
| JP | 11-053402 A | 2/1999 |
| JP | 2000-227923 A | 8/2000 |
| JP | 2003-518687 | 6/2003 |
| JP | 2006-343932 A | 12/2006 |
| JP | 2007-042050 A | 2/2007 |
| JP | 2007-109118 A | 4/2007 |
| JP | 2007-133794 A | 5/2007 |
| JP | 2008-281715 A | 11/2008 |
| JP | 2009-3601 A | 1/2009 |
| JP | 2009-9461 A | 1/2009 |
| JP | 2009-086974 A | 4/2009 |

OTHER PUBLICATIONS

Office Action issued Nov. 12, 2013 in Japanese Patent Application No. 2010-060869.

Office Action issued Apr. 21, 2015 in Japanese Patent Application No. 2014-154650.

\* cited by examiner

401 — Supplement2: What is "AM1.5"?
AM = Air Mass
Irradiation light of 100W/m2
It means the distance in which the sunlight passes
403

405 — Supplement2: What is "AM1.5"?
AM = Air Mass
Irradiation light of 100W/m2
It means the distance in which the sunlight passes

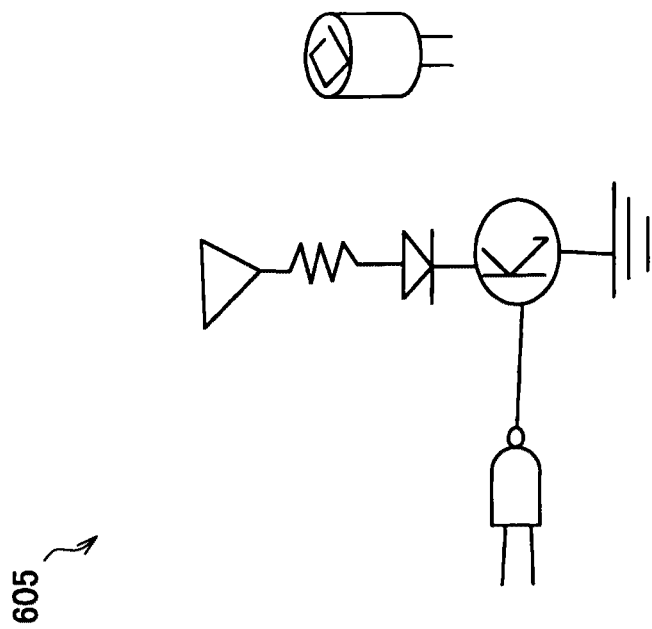
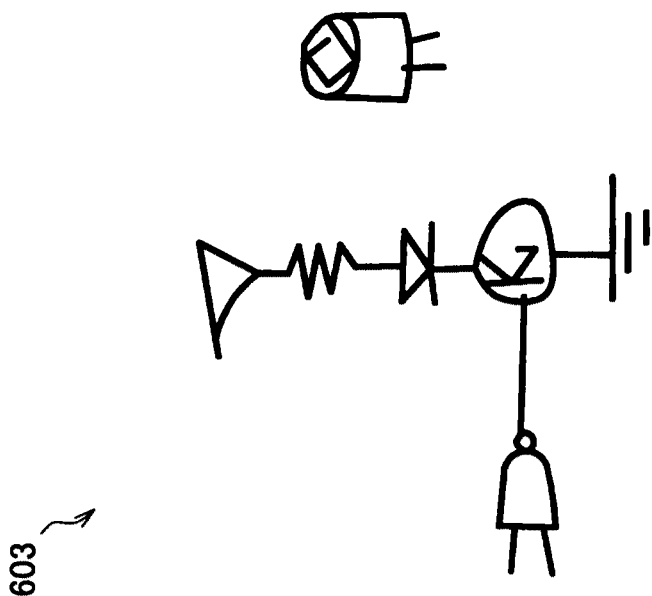
FIG. 15

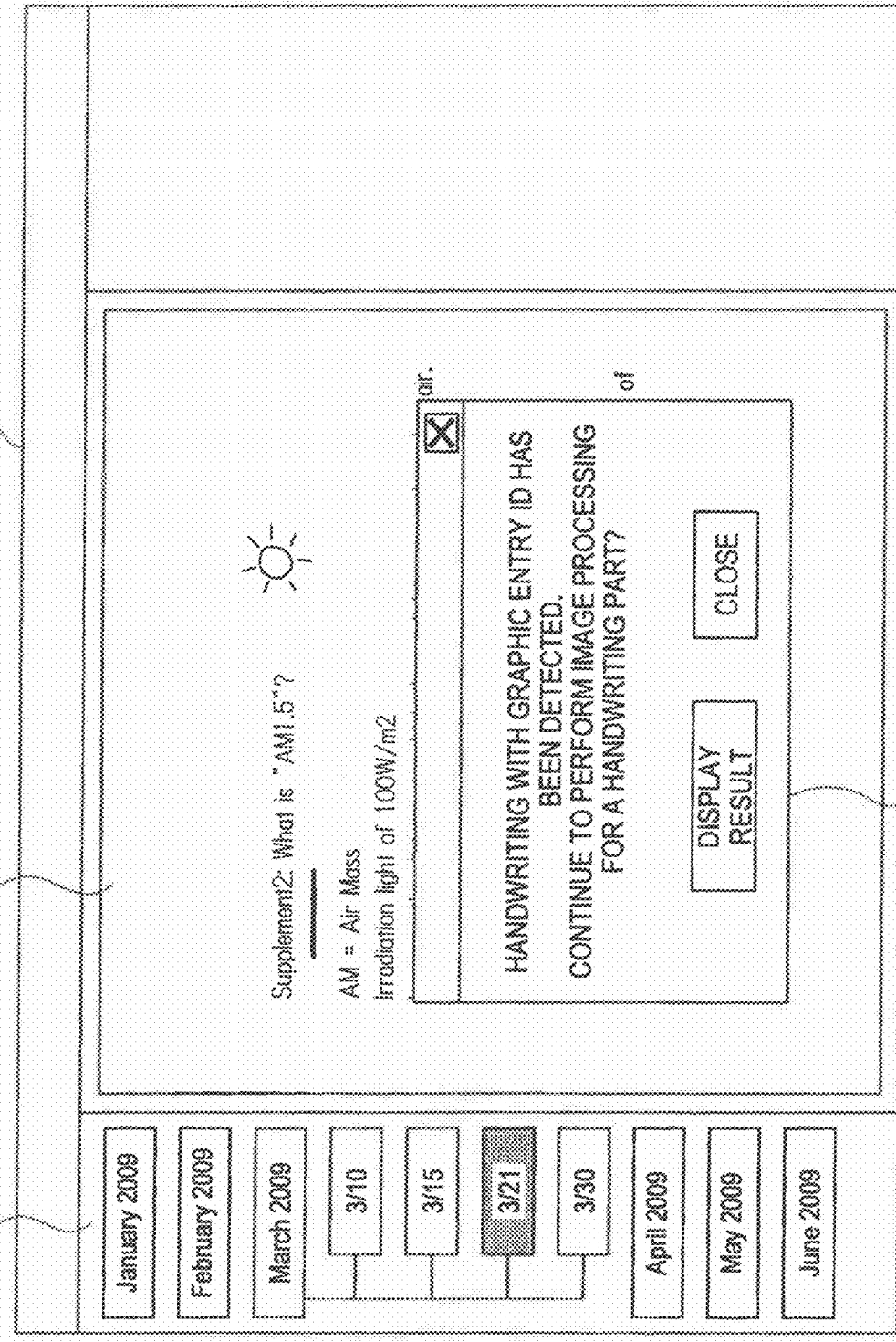

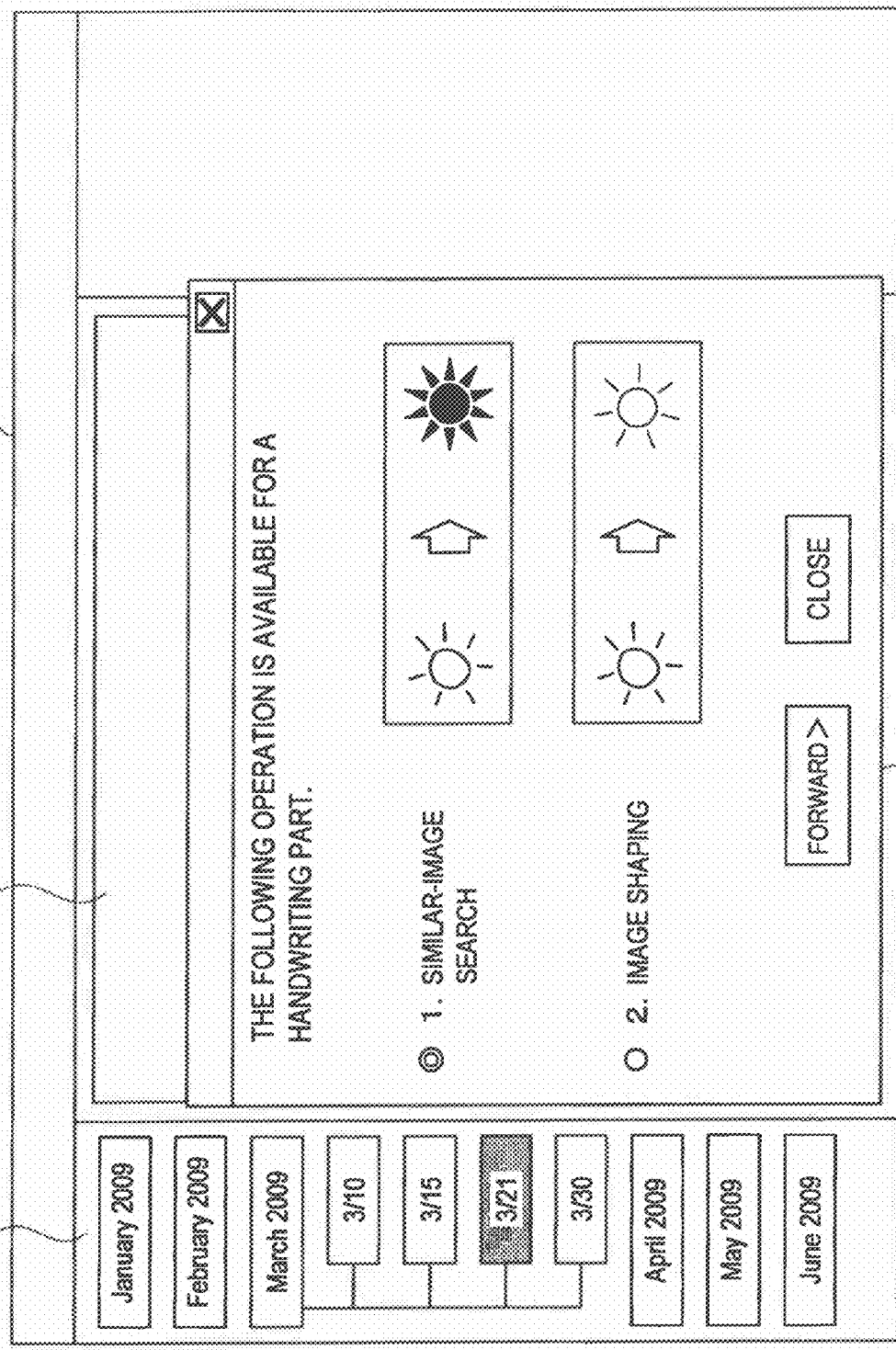

INFORMATION PROCESSING DEVICE, PROGRAM, RECORDING MEDIUM, AND INFORMATION PROCESSING SYSTEM

BACKGROUND OF THE INVENTION

Field of the Invention

The present invention relates to an information processing device, a program, a recording medium, and an information processing system.

Description of the Related Art

Electronic pens are known as input means directed to an information processing device. The electronic pen is a unit for inputting handwriting of a user by an electromagnetic induction method, a resistive method, an infrared light/ultrasonic wave method, an Anoto method, or the like. There is an advantage in that the electronic pen enables an intuitive input to be made by handwriting, and is lightweight and can be easily carried even when a receiver (sometimes unnecessary) is included.

In general, handwriting data of the user input to the information processing device by the electronic pen as described above is coordinate information indicating a position where handwriting is performed. The coordinate information can be converted into a character string processable in the information processing device by performing processing of, for example, an optical character reader (OCR), for the coordinate information.

The user can perform various manipulations for the character string into which the conversion is performed as described above using the information processing device. For example, the manipulation of creating a file as a document or using it as a search keyword so as to check a handwritten word is possible.

Thus, a technique for not only inputting handwriting data of a user but also enabling manipulation to be facilitated in an information processing device after the input has been developed in an information processing system including an electronic pen. For example, a technique of using an electronic pen as a function of an auxiliary input device such as a joystick or mouse has been disclosed in Japanese Patent Application Laid-Open No. 2007-122659.

SUMMARY OF THE INVENTION

As described above, there is one advantage in that the electronic pen can be easily carried. Thus, the user may usually accumulate data by performing handwriting while carrying only the electronic pen and the receiver, and input the data to the information processing device after a certain amount of time. In this case, for example, there is a problem in that, although the user may be thinking about how to process the handwriting data when inputting it to the information processing device, he or she may forget after the time has elapsed.

In light of the foregoing, it is desirable to provide a novel and improved communication device, program, recording medium, and information processing system that enable a user to semi-automatically perform desired processing for handwriting data of an electronic pen.

According to an embodiment of the present invention, there is provided an information processing device which includes a receiving unit which receives handwriting data of an electronic pen accompanied by attribute information added by a user; a recognizing unit which recognizes a character string or a graphic from the handwriting data accompanied by the attribute information and associates the attribute information accompanying the handwriting data with the character string or the graphic; a search unit which searches for user-desired information on the basis of the character string or the graphic and the attribute information associated with the character string or the graphic; a converting unit which converts the user-desired information to display data; and a display unit which displays the display data.

By this composition, the user can perform desired processing for a character string or a graphic recognized from handwriting data of the electronic pen without additional manipulation by the user if the handwriting data is received in the information processing device.

If the handwriting data accompanied by the attribute information is received by the receiving unit, the recognizing unit may automatically recognize the character string or the graphic and associates the attribute information with the character string or the graphic.

If the attribute information associated with the character string or the graphic exists, the search unit may automatically search for the user-desired information on the basis of the attribute information associated with the character string or the graphic.

The search unit may search for a type of information corresponding to a type of the attribute information.

The information processing device may further include an input unit which receives manipulation of the user. The search unit may search for a type of information designated by the manipulation of the user received by the input unit among a plurality of types of information corresponding to the type of the attribute information.

The information processing device may further include a communication unit which communicates with a network. The search unit may search for the user-desired information from information on the network via the communication unit.

The information processing device may further include a storage unit in which information is stored. The search unit may search for the user-desired information from the information stored in the storage unit.

The search unit may search for character information related to the character string as the user-desired information.

The search unit may search for image information similar to the graphic as the user-desired information.

The search unit may search for graphic element information into which the graphic is broken as the user-desired information. The converting unit may generate information of a shaped graphic by combining the graphic element information.

The search unit may search for image information related to a character string included in a region of the graphic as the user-desired information.

According to another embodiment of the present invention, there is provided an information processing system which includes an electronic pen which transmits handwriting data; a receiver which receives the handwriting data and transmits the handwriting data accompanied by attribute information added by a user; and an information processing device including a receiving unit which receives the handwriting data accompanied by the attribute information, a recognizing unit which recognizes a character string or a graphic from the handwriting data accompanied by the attribute information and associating the attribute information accompanying the handwriting data with the character string or the graphic, a search unit which searches for user-desired information on the basis of the character string or the graphic and the attribute information associated with the character string or the graphic, a converting unit which converts the user-desired information to display data, and a display unit which displays the display data.

According to yet another embodiment of the present invention, there is provided a program for causing a computer to execute the step of receiving handwriting data of an electronic pen accompanied by attribute information added by a user; the step of recognizing a character string or a graphic from the handwriting data accompanied by the attribute information and associating the attribute information accompanying the handwriting data with the character string or the graphic; the step of searching for user-desired information on the basis of the character string or the graphic and the attribute information associated with the character string or the graphic; the step of converting the user-desired information to display data; and the step of displaying the display data.

According to yet still another embodiment of the present invention, there is provided a computer readable recording medium storing a program for causing a computer to execute the step of receiving handwriting data of an electronic pen accompanied by attribute information added by a user; the step of recognizing a character string or a graphic from the handwriting data accompanied by the attribute information and associating the attribute information accompanying the handwriting data with the character string or the graphic; the step of searching for user-desired information on the basis of the character string or the graphic and the attribute information associated with the character string or the graphic; the step of converting the user-desired information to display data; and the step of displaying the display data.

According to the present invention as described above, the user can easily perform desired processing for handwriting data of the electronic pen.

BRIEF DESCRIPTION OF THE DRAWINGS

FIG. 15 is a diagram showing an example of handwriting performed by a user in the information processing system according to a third embodiment of the present invention;

FIG. 22 is a diagram showing an example of a screen displayed by the information processing device according to the same embodiment; and FIG. 23 is a diagram showing another example of a screen displayed by the information processing device according to the same embodiment.

DETAILED DESCRIPTION OF THE EMBODIMENTS

Figure 1:
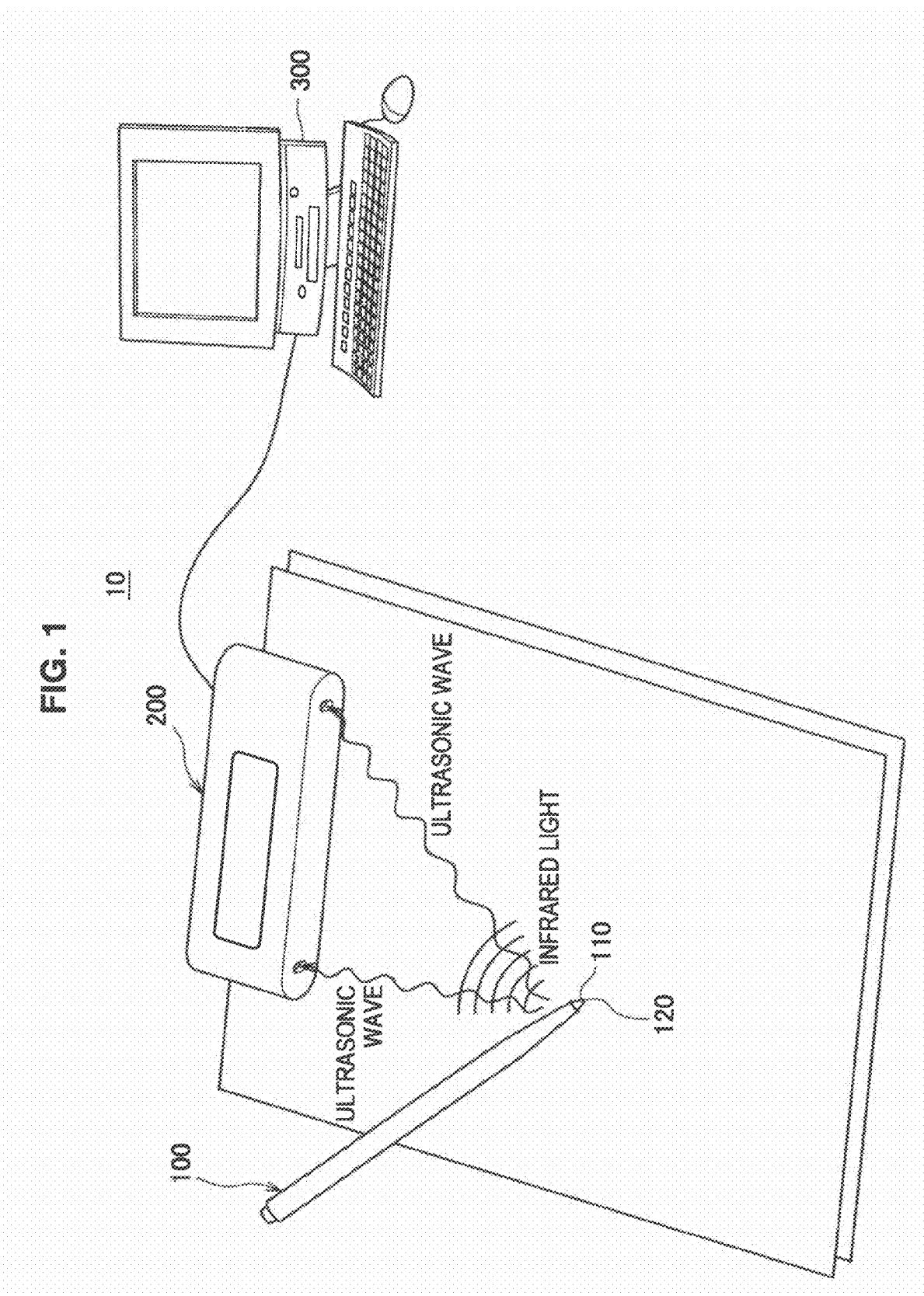
FIG. 1 is a diagram showing an outline of an information processing system according to an embodiment of the present invention.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

Description is given in the following order.
1. Common Configuration of Embodiments
  1-1. Information Processing System
  1-2. Electronic Pen and Receiver
    1-2-1. Case where Attribute Information is added by Electronic Pen
    1-2-2. Case where Attribute Information is added by Receiver
  1-3. Information Processing Device
2. First Embodiment
3. Second Embodiment
4. Third Embodiment
5. Fourth Embodiment
6. Fifth Embodiment
7. Supplement <Common Configuration of Embodiments>
(1-1. Information Processing System)

FIG. 1 is a diagram showing an outline of an information processing system 10 according to an embodiment of the present invention. The information processing system 10 includes an electronic pen 100, a receiver 200, and an information processing device 300.

The electronic pen 100 is retained by a user who performs handwriting. While the user performs handwriting, the electronic pen 100 transmits an ultrasonic wave signal and an infrared light signal by an ultrasonic wave transmitting unit 110 and an infrared light transmitting unit 120 provided on a pen tip.

The receiver 200 receives the ultrasonic wave signal and the infrared light signal transmitted from the electronic pen 100, and generates handwriting data by specifying coordinates of the electronic pen 100. Here, the handwriting data is handwriting data handwritten by the user with the electronic pen 100.

The receiver 200 adds attribute information to the handwriting data. Here, the attribute information is additional information indicating user-desired processing for the handwriting data when the handwriting data is input and used in the information processing device 300. The handwriting data accompanied by the attribute information may be accumulated in the receiver 200.

For example, the above-described attribute information may indicate "use as a search keyword," "similar-image search," "graphic shaping," "direct use as text or graphic," and the like. The user's manipulation for adding the attribute information is received by the electronic pen 100 or the receiver 200.

The information processing device 300 is connected to the receiver 200 and receives the handwriting data accompanied by the attribute information, and, for example, is a personal computer (PC). While the user performs handwriting with the electronic pen 100, the receiver 200 and the information processing device 300 may not be connected. In this case, the handwriting data accompanied by the attribute information is accumulated in the receiver 200 and is collectively input to the information processing device 300 when the receiver 200 is connected to the information processing device 300 after the end of a string of handwriting.

In addition, the information processing device 300 performs various types of processing for the handwriting data accompanied by the attribute information. For example, the information processing device 300 recognizes a character string or a graphic from the handwriting data received as coordinate information by processing such as OCR or the like. In addition, the information processing device 300 searches for information by using the identified character string as a keyword, or edits the identified graphic, on the basis of the attribute information.

In the above-described information processing system 10, the electronic pen 100 uses an infrared light/ultrasonic wave method, and the receiver 200 is separated from the information processing device 300. However, other methods such as an electromagnetic induction method, a resistive method, an Anoto method, and the like may be used in the electronic pen 100. The receiver 200 may be differently configured in response to a method of the electronic pen 100, and may be integrated with the information processing device 300.

(1-2. Electronic Pen and Receiver)
(1-2-1. Case where Attribute Information is Added by Electronic Pen)

In an embodiment of the present invention, the user's manipulation for adding the attribute information is received by the electronic pen 100 or the receiver 200. Here, first, the case where the user's manipulation for adding the attribute information is received by the electronic pen 100 will be described.

Figure 2:
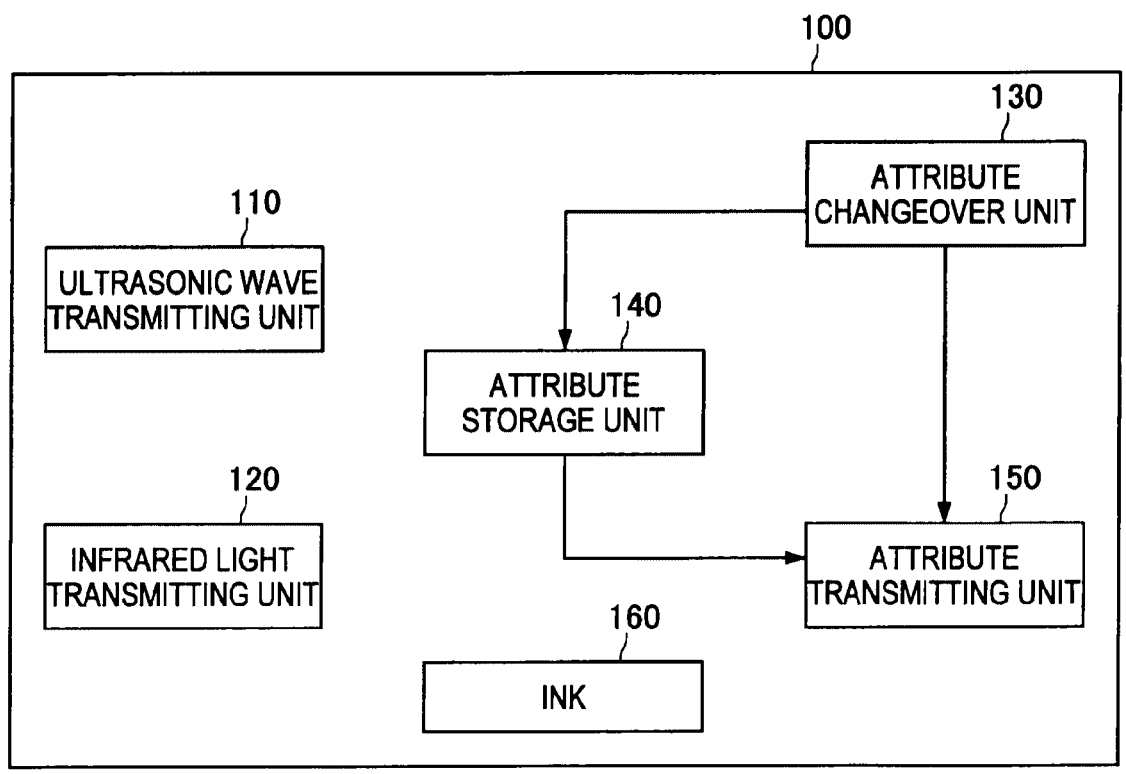
FIG. 2 is a diagram showing an example of a functional configuration of an electronic pen according to an embodiment of the present invention.

FIG. 2 is a diagram showing an example of a functional configuration of the electronic pen 100 according to an embodiment of the present invention. For example, in the infrared light/ultrasonic wave method, the electronic pen 100 includes the ultrasonic wave transmitting unit 110, the infrared light transmitting unit 120, an attribute changeover unit 130, an attribute storage unit 140, an attribute transmitting unit 150, and ink 160.

The ultrasonic wave transmitting unit 110 transmits an ultrasonic wave signal, and, for example, is a speaker. The infrared light transmitting unit 120 transmits an infrared light signal, and is, for example, a light emitting diode (LED). The ultrasonic wave signal and the infrared light signal may be transmitted only while the user performs handwriting with the electronic pen 100.

The attribute changeover unit 130 receives the user's manipulation for switching the attribute information. For example, the attribute changeover unit 130 can be mounted as a switch provided in the electronic pen 100. Hereinafter, this example will be described with reference to FIGS. 3 and 4.

Figure 3:
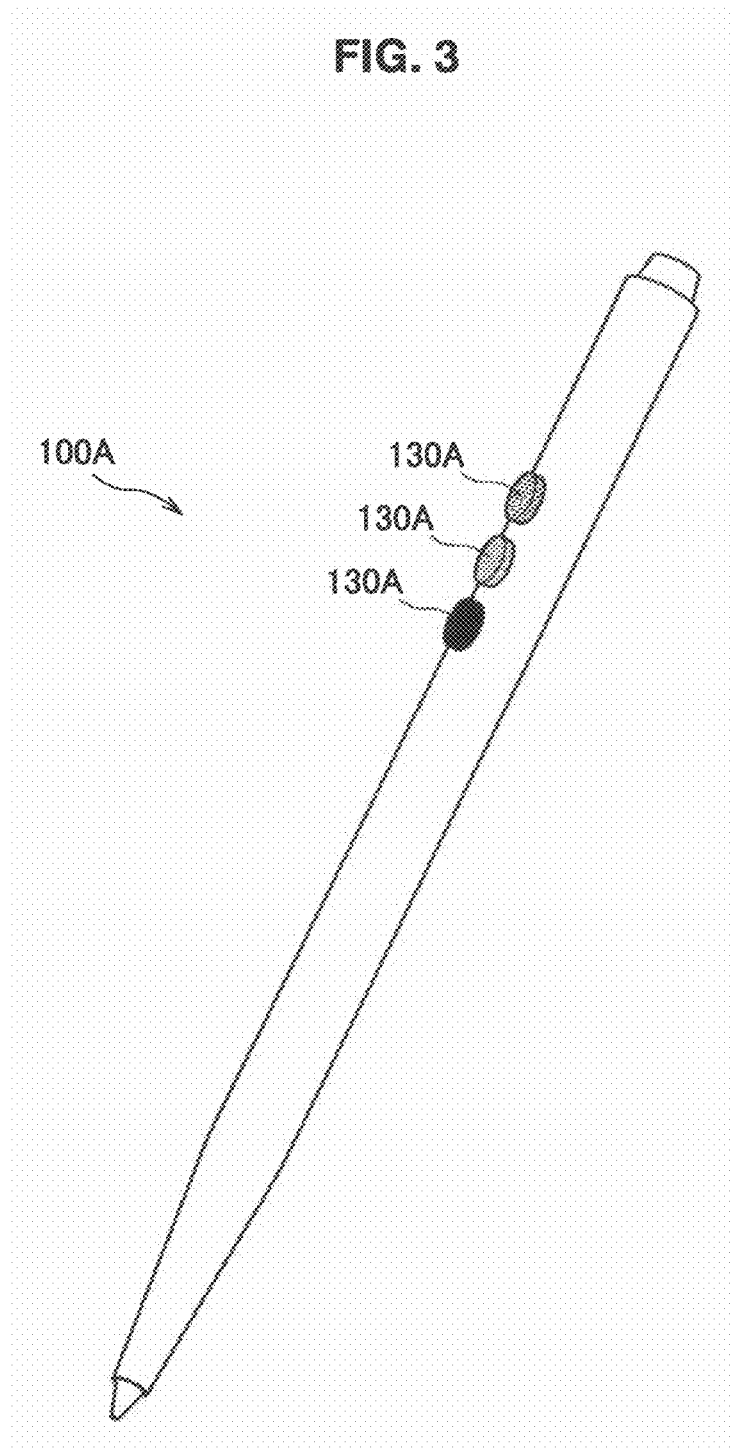
FIG. 3 is a diagram showing a mounting example of changeover switches in the electronic pen according to an embodiment of the present invention.

FIG. 3 is a diagram showing an electronic pen 100A in which button-type changeover switches 130A are mounted as the attribute changeover unit 130 in the electronic pen 100 according to an embodiment of the present invention. Buttons respectively corresponding to attributes are provided in the changeover switches 130A. The user performs handwriting by pressing a button of a changeover switch 130A corresponding to a desired attribute.

Figure 4:
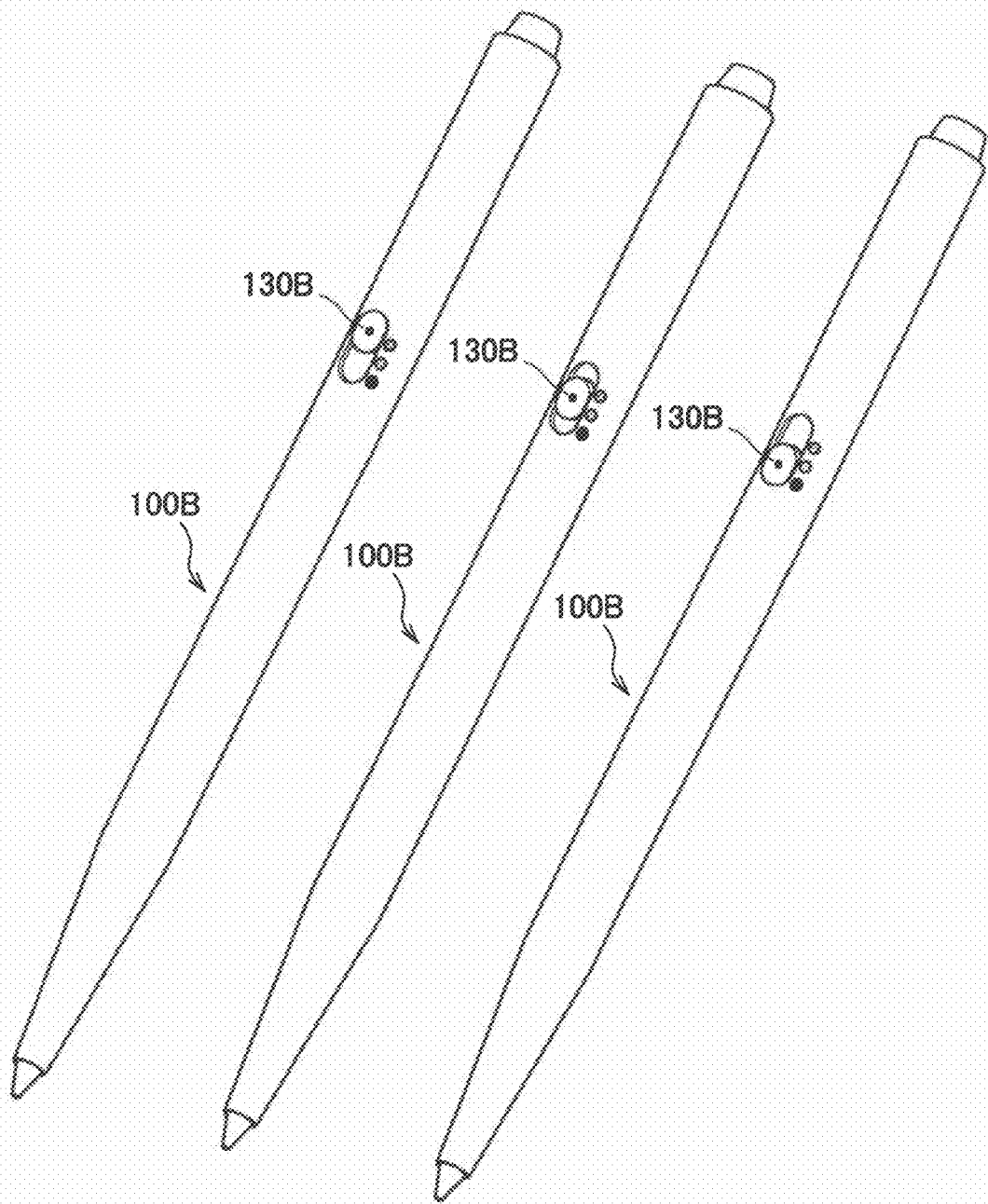
FIG. 4 is a diagram showing another mounting example of changeover switches in the electronic pen according to an embodiment of the present invention.

FIG. 4 is a diagram showing an electronic pen 100B in which a slide-type changeover switch 130B is provided as the attribute changeover unit 130 in the electronic pen 100 according to an embodiment of the present invention. Positions respectively corresponding to attributes are provided in the changeover switch 130B, and the user performs handwriting by causing the changeover switch 130B to slide to a position corresponding to a desired attribute.

Besides the above-described examples, the attribute changeover unit 130 can be mounted as various known types of switches, for example, such as a rotary switch, a switch that is switched in response to the number of presses of a single button, and the like. Also, the attribute changeover unit 130 can be provided as a sensor that senses a tilt, vibration, or the like of the electronic pen 100.

When the user desires to use handwriting data in "direct use as text or graphic," that is, even when no attribute is designated, although not specifically mentioned in the description of the following embodiment, it becomes a target of changeover by the above-described attribute changeover unit 130. That is, for example, in the above-described changeover switches 130A and 130B, a button or position corresponding to the fact that "no attribute is designated" may be provided in addition to buttons or positions corresponding to attributes to be mentioned in the description of the following embodiments.

Again with reference to FIG. 2, the attribute storage unit 140 stores attribute information switched by the user's manipulation received in the attribute changeover unit 130. For example, the attribute storage unit 140 may be mounted by a small-size storage device such as a flash memory or the like. For example, if the attribute changeover unit 130 is a switch of which a position is capable of being retained by a mechanical structure, the attribute changeover unit 130 retaining the position may be used in place of the attribute storage unit 140.

The attribute transmitting unit 150 transmits selected attribute information by adding the selected attribute information to the handwriting data. The attribute transmitting unit 150 may be mounted as a radio communication device provided separately from the ultrasonic wave transmitting unit 110 and the infrared light transmitting unit 120. The attribute transmitting unit 150 may be a device for providing a predetermined change indicating attribute information to a signal transmitted by the ultrasonic wave transmitting unit 110 or the infrared light transmitting unit 120.

The ink 160 is used for handwriting on paper with the electronic pen 100. The ink 160 can be mounted regardless of an element of the attribute changeover unit 130 or the like, but a different color may be used by a known method for changing a handwriting color in response to an attribute switched by the attribute changeover unit 130.

Figure 5:
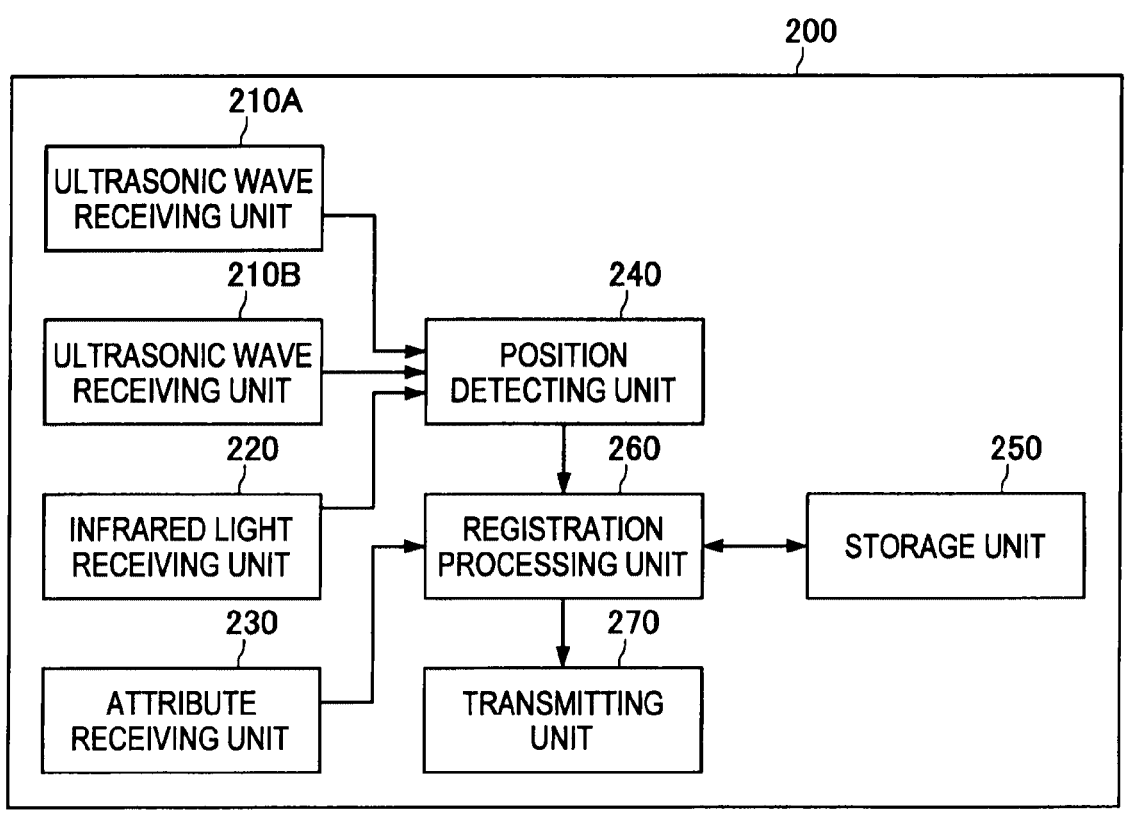
FIG. 5 is a diagram showing an example of a functional configuration of a receiver according to an embodiment of the present invention.

FIG. 5 is a diagram showing an example of a functional configuration of the receiver 200 according to an embodiment of the present invention. For example, in the infrared light/ultrasonic wave method, the receiver 200 includes ultrasonic wave receiving units 210A and 210B, an infrared light receiving unit 220, an attribute receiving unit 230, a position detecting unit 240, a storage unit 250, a registration converting unit 260, and a transmitting unit 270.

The ultrasonic wave receiving units 210A and 210B receive an ultrasonic wave signal transmitted by the electronic pen 100, and are, for example, microphones. The infrared light receiving unit 220 receives an infrared light signal transmitted by the electronic pen 100, and is, for example, a photodiode.

The attribute receiving unit 230 receives attribute information from the electronic pen 100. The attribute receiving unit 230 may be mounted as a radio communication device provided separately from the ultrasonic wave receiving units 210A and 210B and the infrared light receiving unit 220. The attribute receiving unit 230 may be mounted in combination with the ultrasonic wave receiving units 210A and 210B and the infrared light receiving unit 220.

The position detecting unit 240 specifies coordinates of the electronic pen 100 from the ultrasonic wave signal and the infrared light signal received by the ultrasonic wave receiving units 210A and 210B and the infrared light receiving unit 220, and generates handwriting data. Hereinafter, an example in which the attribute receiving unit 230 and the position detecting unit 240 perform processing will be described with reference to FIG. 6.

Figure 6:
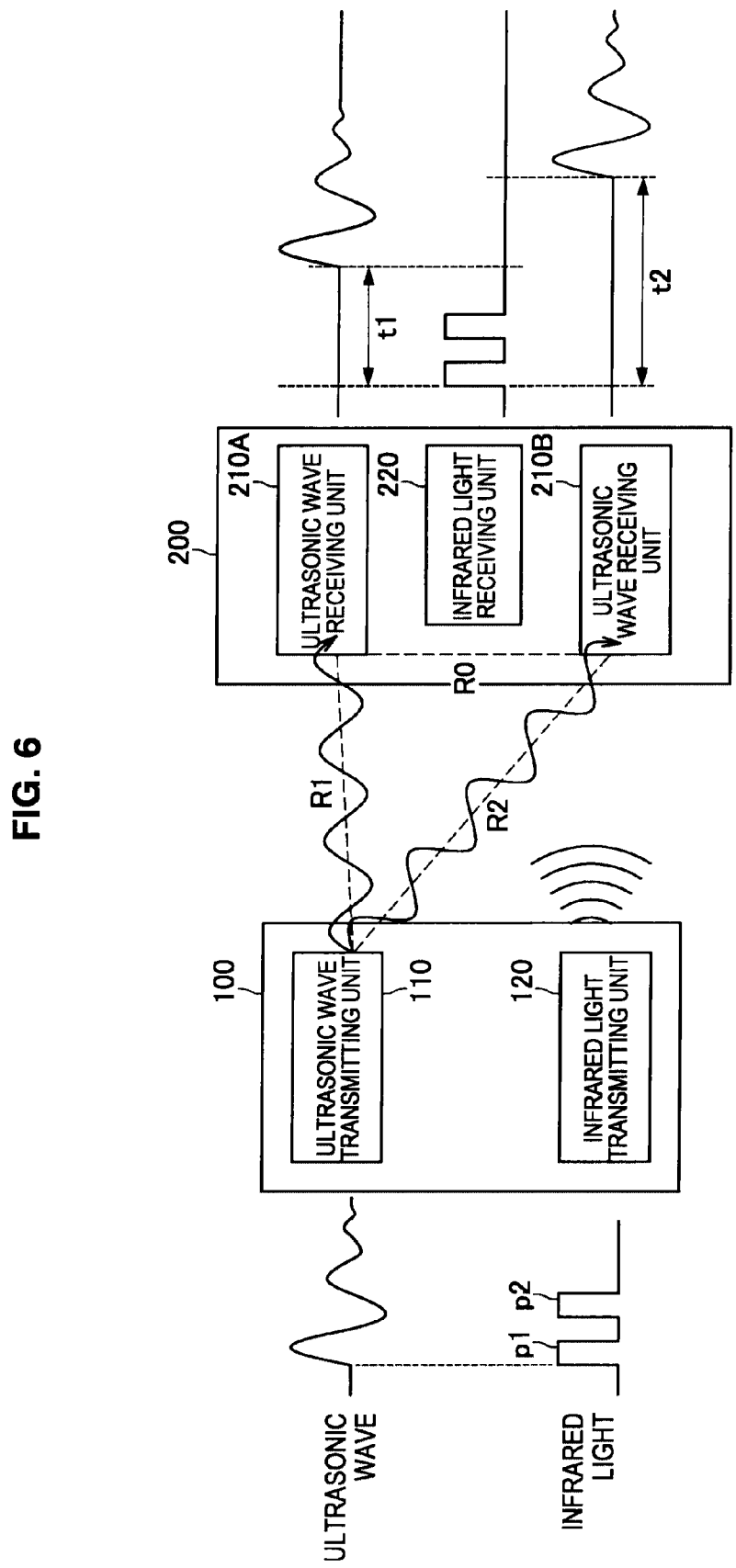
FIG. 6 is a diagram showing an example of a signal transmitted from the electronic pen to the receiver according to an embodiment of the present invention.

FIG. 6 is a diagram showing an example of a signal including attribute information transmitted from the electronic pen 100 to the receiver 200 according to an embodiment of the present invention. The receiver 200 receives an ultrasonic wave signal transmitted from the ultrasonic wave transmitting unit 110 of the electronic pen 100 by the ultrasonic wave receiving units 210A and 210B, and receives an infrared light signal transmitted from the infrared light transmitting unit 120 of the electronic pen 100 by the infrared light receiving unit 220.

In the shown infrared light/ultrasonic wave method, time differences t1 and t2 occur at a time when the infrared light receiving unit 220 receives the infrared light signal from the electronic pen 100 and times when the ultrasonic wave receiving units 210A and 210B receive the ultrasonic wave signal from the electronic pen 100 in response to a position of the electronic pen 100. The position detecting unit 240 of the receiver 200 calculates distances R1 and R2 from the ultrasonic wave receiving units 210A and 210B to the electronic pen 100 by the time differences t1 and t2 and a known spacing R0 of the ultrasonic wave receiving units 210A and 210B, and thereby specifies the position of the electronic pen 100.

Here, for example, the attribute transmitting unit 150 of the electronic pen 100 can transmit an infrared light signal having a pattern in which a pulse signal p2 indicating that specific attribute information is added to an original pulse signal p1, to the infrared light transmitting unit 120. In this case, the attribute receiving unit 230 of the receiver 200 determines that attribute information added to the handwriting data has been received if a pattern of an infrared light signal received by the infrared light receiving unit 220 includes the pulse signal p2.

Processing of transmitting/receiving attribute information as described above can also be performed for an ultrasonic wave signal transmitted by the ultrasonic wave transmitting unit 110 of the electronic pen 100. If other methods in which a change can be added to a signal such as the Anoto method and the like are used in the electronic pen 100, the same processing can be performed for a signal to be transmitted/received in the other methods.

Again with reference to FIG. 5, the storage unit 250 stores handwriting data accompanied by attribute information and a program for realizing a function of the receiver 200, if necessary, and is, for example, a storage device such as a read only memory (ROM) or a random access memory (RAM).

The registration processing unit 260 causes attribute information received by the attribute receiving unit 230 to correspond to handwriting data generated by the position detecting unit 240, and stores them in the storage unit 250.

The transmitting unit 270 transmits the handwriting data accompanied by the attribute information stored in the storage unit 250 to the information processing device 300, and is, for example, a wired or wireless communication interface such as a universal serial bus (USB) or a local area network (LAN).

Here, the position detecting unit 240 and the registration processing unit 260 may be mounted by dedicated hardware, or may be mounted by appropriately combining software. If they are mounted by software, a function of each part is realized by enabling a central processing unit (CPU) to execute the program stored in the storage unit 250.

(1-2-2. Case where Attribute Information is Added by Receiver)

Next, the case where the user's manipulation for adding attribute information is received by the receiver 200 will be described. In this case, it is unnecessary to provide the attribute changeover unit 130, the attribute storage unit 140, and the attribute transmitting unit 150 in the electronic pen 100. The electronic pen 100 can have the same configuration as an electronic pen that is used in general. On the other hand, the attribute receiving unit 230 of the receiver 200 is mounted as an interface that receives the user's manipulation for adding the attribute information.

Figure 7:
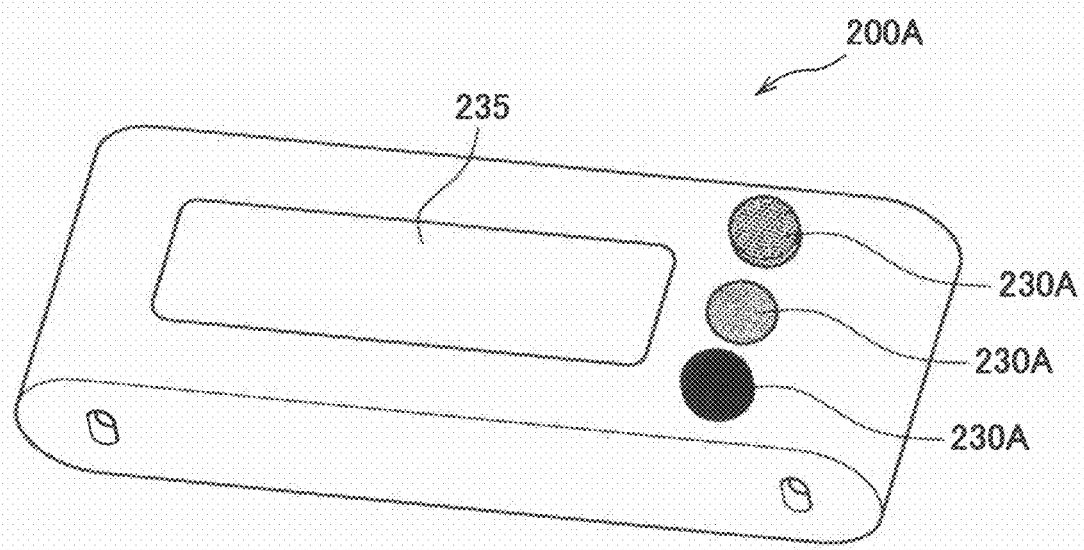
FIG. 7 is a diagram showing a mounting example of changeover switches in the receiver according to an embodiment of the present invention.

FIG. 7 is a diagram showing a receiver 200A in which button-type changeover switches 230A are mounted as the attribute receiving unit 230 in the receiver 200 according to an embodiment of the present invention. Buttons respectively corresponding to attributes are provided in the changeover switches 230A, and the user performs handwriting by pressing a button of a changeover switch 230A corresponding to a desired attribute.

In the above-described case, the attribute receiving unit 230 can be mounted as various known types of switches like the attribute changeover unit 130 of the electronic pen 100. The receiver 200A may be configured to have a display screen 235 and display selected attribute information thereon.

(1-3. Information Processing Device)

In an embodiment of the present invention, handwriting data accompanied by attribute information is transmitted from the receiver 200 to the information processing device 300. The information processing device 300 performs various types of processing for the handwriting data on the basis of the attribute information.

Figure 8:
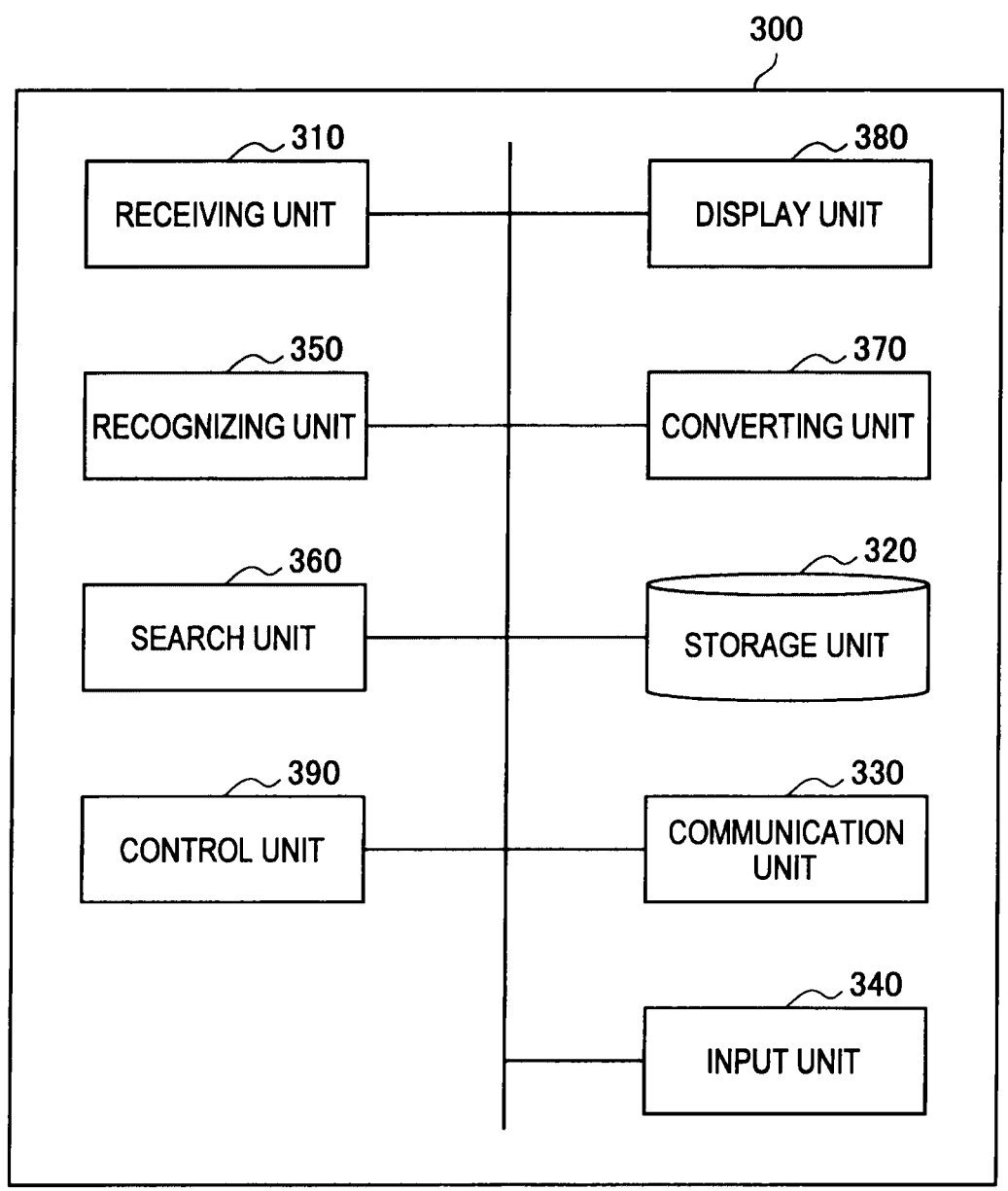
FIG. 8 is a diagram showing an example of a functional configuration of an information processing device according to an embodiment of the present invention.

FIG. 8 is a diagram showing an example of a functional configuration of the information processing device 300 according to an embodiment of the present invention. For example, the information processing device 300 includes a receiving unit 310, a storage unit 320, a communication unit 330, an input unit 340, a recognizing unit 350, a search unit 360, a converting unit 370, a display unit 380, and a control unit 390.

The receiving unit 310 receives the handwriting data and the attribute information transmitted from the receiver 200, and is, for example, a wired or wireless communication interface of a USB, a LAN, or the like.

The storage unit 320 stores handwriting data to be used for a series of processing in the information processing device 300 or a program for realizing a function of the information processing device 300, and is an appropriate combination of, for example, a storage device such as a ROM, a RAM, or the like, a secondary storage device such as a hard disk drive (HDD) or an optical disk, and a removable storage medium such as a semiconductor memory.

The communication unit 330 transmits/receives information to/from a network, and is, for example, a wired or wireless communication interface such as a LAN connected to the Internet, and is provided if necessary. The input unit 340 receives manipulation by the user directed to the information processing device 300, and is, for example, a device such as a mouse or a keyboard.

The recognizing unit 350 recognizes a character string or a graphic from handwriting data received by the receiving unit 310. Also, the recognizing unit 350 associates attribute information accompanying the handwriting data with the recognized character string or graphic.

The search unit 360 performs search processing for user-desired information on the basis of the attribute information associated with the character string or the graphic, and the character string and the graphic recognized by the recognizing unit 350. For example, the search processing may be an Internet search to be performed via the communication unit 330, or may be a local search to search for data of a file or the like stored in the storage unit 320.

The converting unit 370 converts information searched for by the search unit 360 to display data. The display unit 380 is a display device such as a monitor provided on the information processing device 300 itself or a device for causing an external display device connected to the information processing device 300 to perform a display operation.

The control unit 390 controls the recognizing unit 350, the search unit 360, the converting unit 370, and the display unit 380. If the receiving unit 310 receives handwriting data accompanied by attribute information, the control unit 390 may cause the recognizing unit 350 to automatically perform recognition and association processing. Also, if the attribute information is associated with the character string or the graphic recognized by the recognizing unit 350, the control unit 390 may cause the search unit 360 to automatically perform search processing.

Here, the recognizing unit 350, the search unit 360, the converting unit 370, the display unit 380, and the control unit 390 may be mounted by dedicated hardware, or may be mounted by appropriately combining software. If they are mounted by software, a function of each part is realized by enabling a CPU to execute the program stored in the storage unit 320 or a program acquired from the network via the communication unit 330.

<2. First Embodiment>

In the first embodiment of the present invention, attribute information of "search keyword" is added to handwriting data. The attribute information of "search keyword" indicates that "search processing is performed using a handwritten word as a keyword." That is, the user performing handwriting by designating the attribute "search keyword" is considered to desire to perform search processing using a word of a part handwritten with the attribute when the handwriting data is input to the information processing device 300.

Figure 9:
FIG. 9 is a diagram showing an example of handwriting performed by a user in the information processing system according to a first embodiment of the present invention.

FIG. 9 is a diagram showing an example in which the user performs handwriting in the information processing system 10 according to the first embodiment of the present invention. In general, the user performs handwriting without designating an attribute in a handwriting part 401.

Here, for example, if the user desires to know the meaning of handwritten words "Air Mass," the user designates the attribute "search keyword" and underlines with an attribute handwriting part 403. Thereafter, the user performs handwriting without again designating the attribute until the next word that the user desires to know a meaning is found.

Thereafter, if handwriting data is input to the information processing device 300, the recognizing unit 350 recognizes "Air Mass" underlined with the attribute "search keyword" as a search keyword 405.

It is not indispensable to designate the search keyword 405 by the underline of the attribute "search keyword." A word itself may be handwritten with the attribute "search keyword," and a border line or the like may be handwritten in place of the underline.

Figure 10:
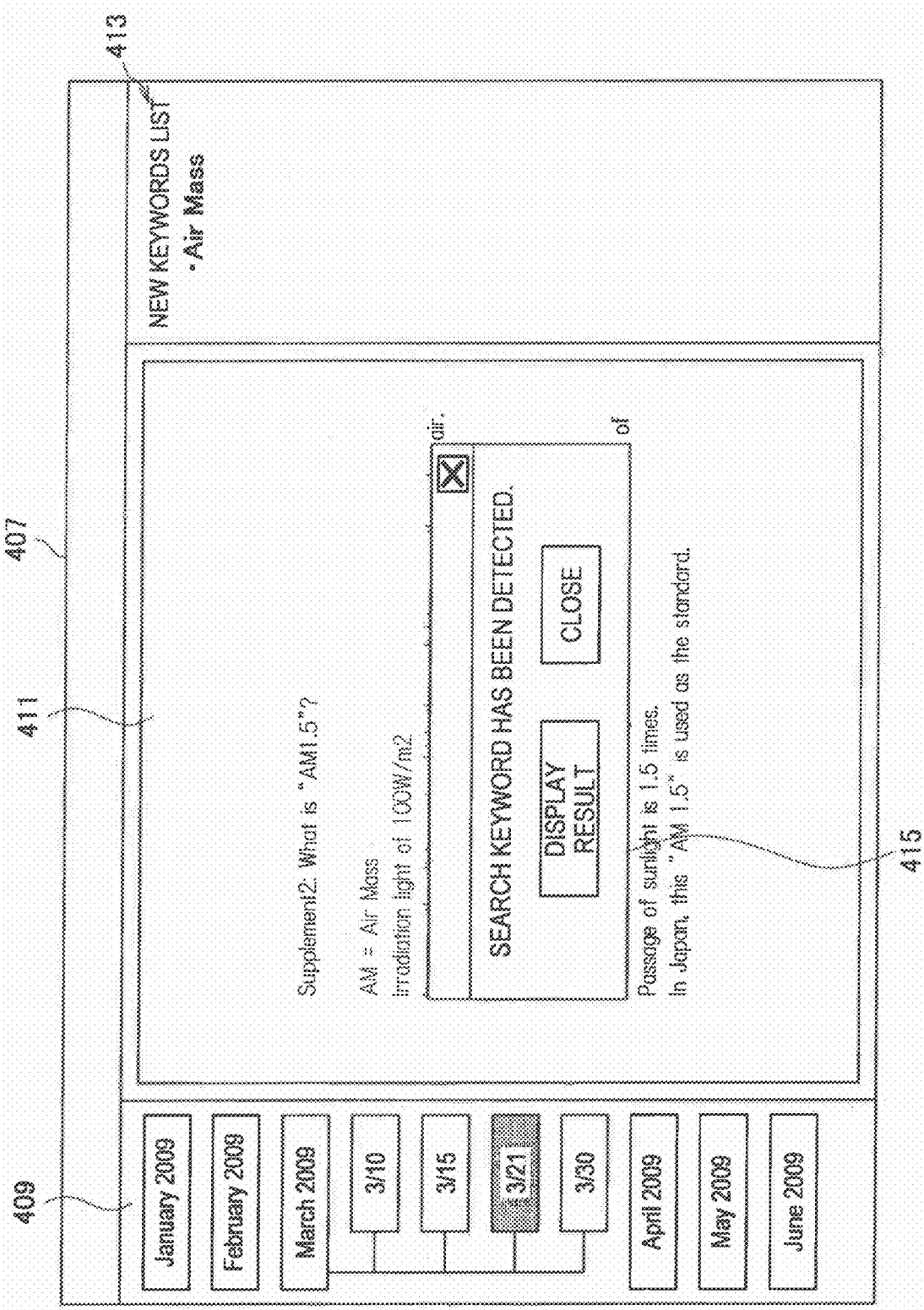
FIG. 10 is a diagram showing an example of a screen displayed by the information processing device according to the same embodiment.

FIG. 10 is a diagram showing an example of a screen displayed by the display unit 380 when handwriting data is input from the receiver 200 to the information processing device 300 in the first embodiment of the present invention. Here, an application window 407 includes a history region 409, a handwriting data display region 411, and the like.

In this case, for example, if a character string recognized by the processing of OCR is handwriting data accompanied by the attribute "search keyword," the recognizing unit 350 of the information processing device 300 extracts the character string as the search keyword.

Next, the search unit 360 performs keyword search processing based on the search keyword extracted by the recognizing unit 350. For example, the keyword search processing may be an Internet search to be performed via the communication unit 330, or may be a local search to search for data of a file or the like stored in the storage unit 320.

The converting unit 370 generates display data of a keyword list 413 by processing information of the search keyword extracted by the recognizing unit 350. The control unit 390 causes the display unit 380 to further display the keyword list 413 generated by the converting unit 370 and a dialog 415 for notifying the user of a result obtained by extracting the search keyword and performing keyword search processing.

Figure 11:
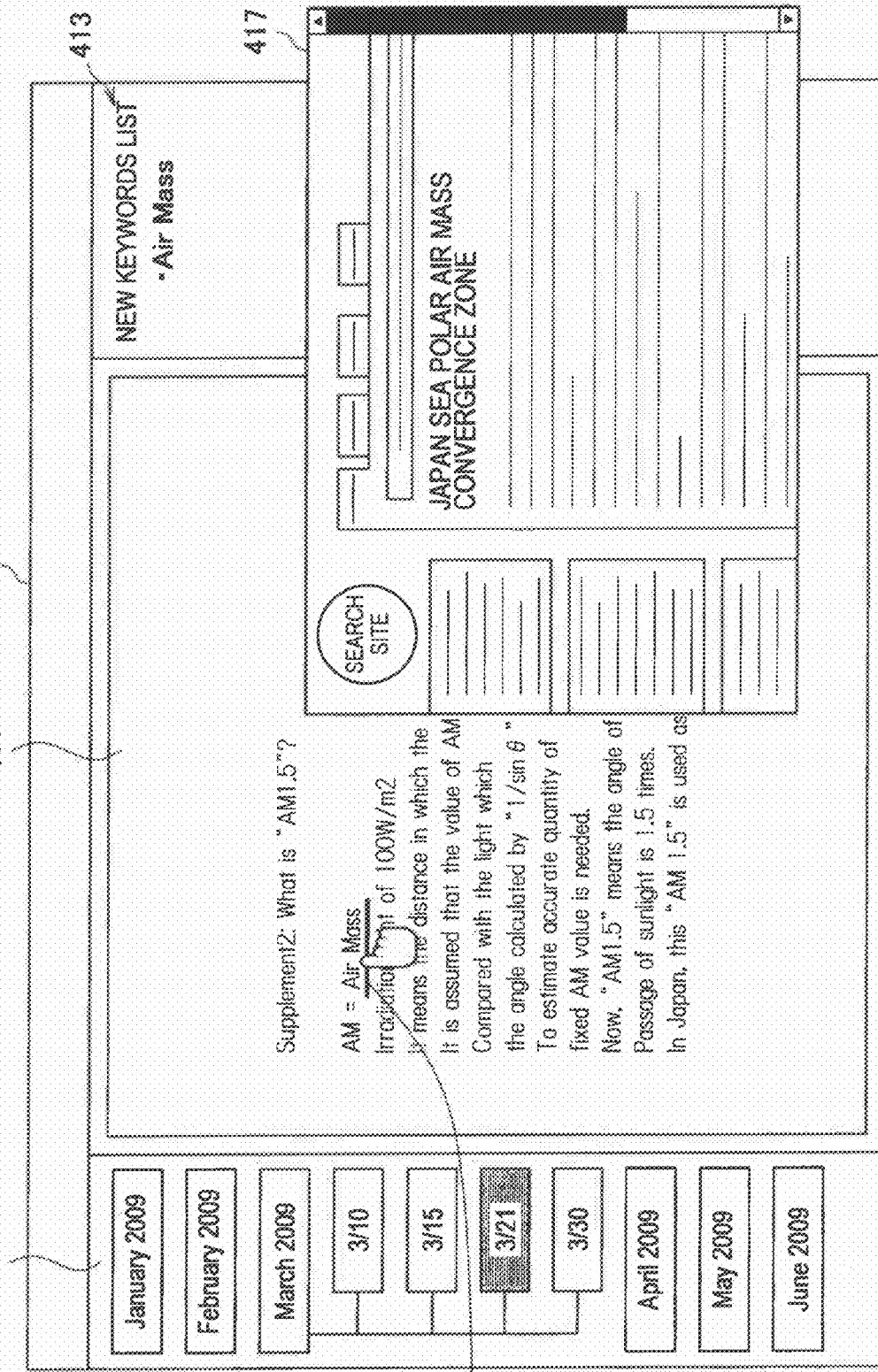
FIG. 11 is a diagram showing another example of a screen displayed by the information processing device according to the same embodiment.

FIG. 11 is a diagram showing another example of a screen in a state in which a "result display" button of the dialog 415 is pressed and a search result window 417 is displayed in the above-described case. The search result window 417 may be displayed if a corresponding keyword display part of the handwriting data display region 411 or a corresponding keyword display part 419 of the keyword list 413 is clicked by a pointer.

Here, for example, if the Internet search is performed by the search unit 360, the search result window 417 is a browser window in which a page of a search result is displayed. If the local search is performed by the search unit 360, the search result window 417 is an application window in which a searched file or the like is displayed.

In addition, a search result for a search keyword handwritten by the user on another date may be browsed as in the above-described case by clicking the date displayed in the history region 409.

<3. Second Embodiment>

In the second embodiment of the present invention, attribute information of "graphic entry" is added to handwriting data. The attribute information of "graphic entry" indicates that "similar-image search processing is performed for handwritten graphic." That is, the user performing handwriting by designating the attribute "graphic entry" is considered to desire to search for an image similar to the handwritten graphic with the attribute when the handwriting data is input to the information processing device 300.

Figure 12:
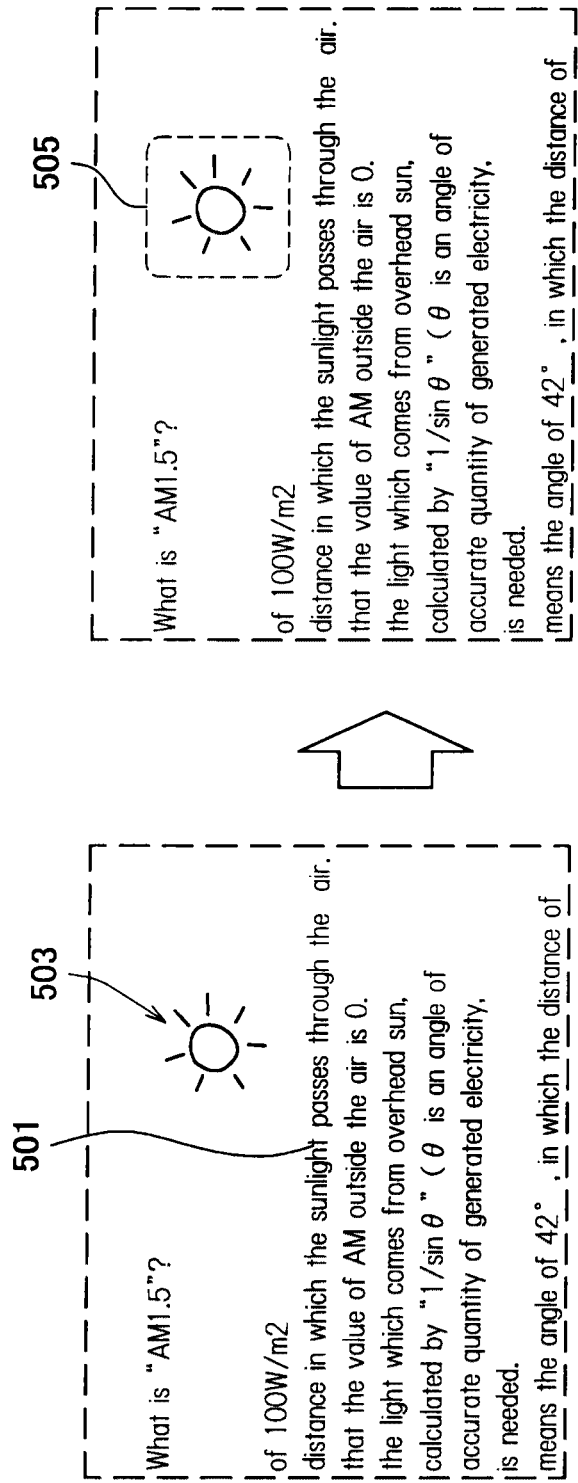
FIG. 12 is a diagram showing an example of handwriting performed by a user in the information processing system according to a second embodiment of the present invention.

FIG. 12 is a diagram showing an example in which the user performs handwriting in the information processing system 10 according to the second embodiment of the present invention. In general, the user performs handwriting without designating an attribute in a handwriting part 501.

Here, for example, if the user desires to render an illustration of the sun, the user designates the attribute "graphic entry," and hand-writes a graphic close to the illustration of the sun imagined by the user as an attribute handwriting part 503. Thereafter, the user performs handwriting without again designating the attribute until the next position where the user desires to arrange a graphic is found.

Thereafter, if handwriting data is input to the information processing device 300, graphic close to the illustration of the sun drawn with the attribute "graphic entry" is recognized as search target graphic 505.

It is not indispensable to designate the search target graphic 505 by handwriting with the attribute "graphic entry." Without designating the attribute, the handwritten graphic may be surrounded with a line handwritten with the attribute "graphic entry."

Figure 13:
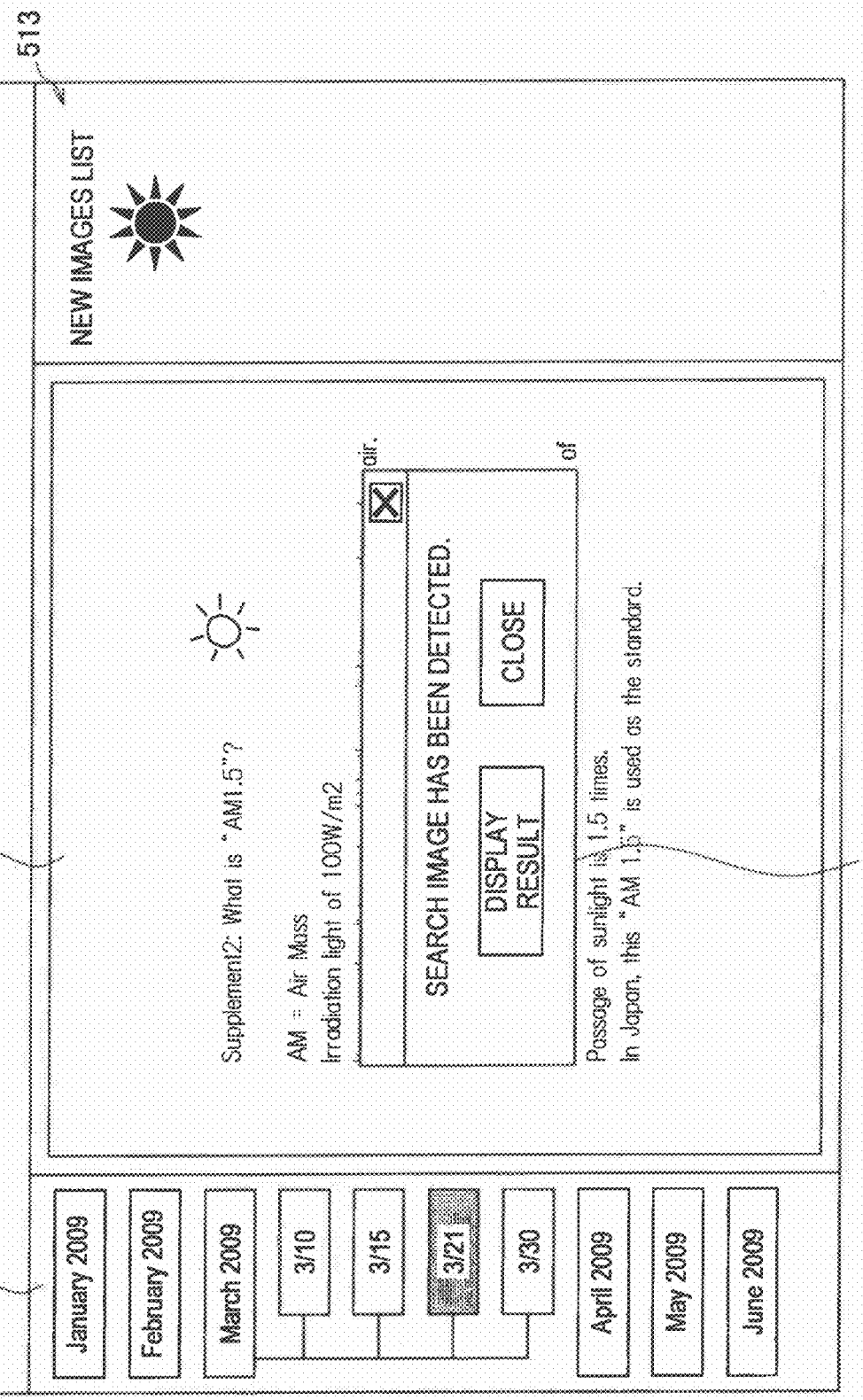
FIG. 13 is a diagram showing an example of a screen displayed by the information processing device according to the same embodiment.

FIG. 13 is a diagram showing an example of a screen displayed by the display unit 380 when handwriting data is input from the receiver 200 to the information processing device 300 in the second embodiment of the present invention. Here, an application window 507 includes a history region 509, a handwriting data display region 511, and the like.

In this case, the recognizing unit 350 of the information processing device 300 extracts a graphic recognized by handwriting data accompanied by the attribute "graphic entry" as the search target graphic.

Next, the search unit 360 performs similar-image search processing on the basis of the search target graphic extracted by the recognizing unit 350. For example, the similar-image search processing may be an Internet-based similar-image search that is performed via the communication unit 330, or may be a local similar-image search that searches for an image file stored in the storage unit 320.

The converting unit 370 generates display data of the search image list 513 by processing information of a similar image searched for by the search unit 360. For example, the converting unit 370 performs processing of generating a thumbnail of the searched similar image or adjusting a size in accordance with a display region. The control unit 390 causes the display unit 380 to further display the search image list 513 generated by the converting unit 370 and a dialog 515 for notifying the user of a result obtained by extracting a search target graphic and performing similar-image search processing.

Figure 14:
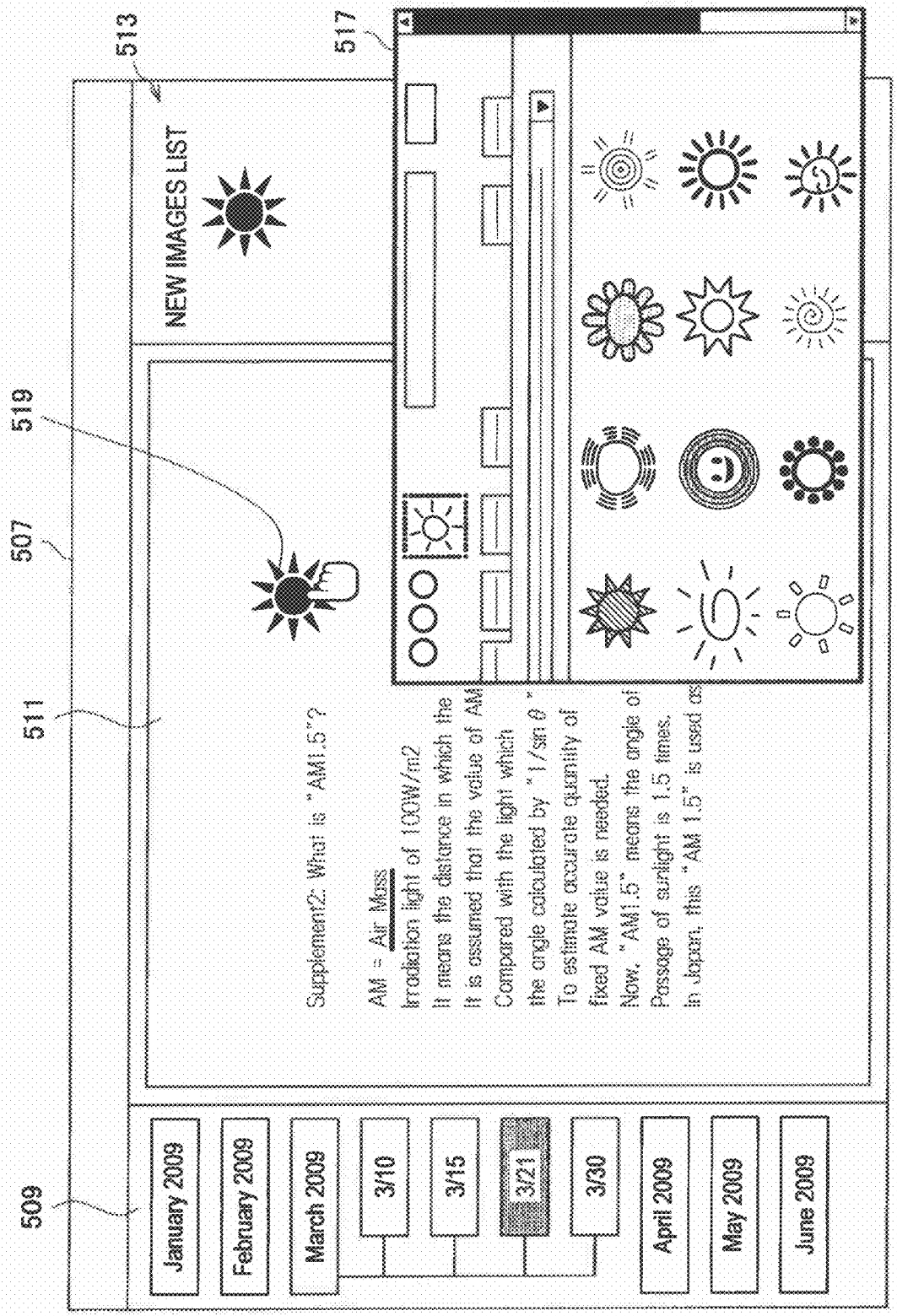
FIG. 14 is a diagram showing another example of a screen displayed by the information processing device according to the same embodiment.

FIG. 14 is a diagram showing another example of a screen in a state in which a "result display" button of the dialog 515 is pressed and a search result window 517 is displayed in the above-described case. The search result window 517 may be displayed if a corresponding graphic display part 519 of the handwriting data display region 511 or a corresponding image of the search image list 513 is clicked by a pointer.

Here, for example, if the Internet-based similar-image search is performed by the search unit 360, the search result window 517 is a browser window in which an image group of a search result is displayed. If the local similar-image search is performed by the search unit 360, the search result window 517 is an application window in which a searched image file is displayed.

In addition, a search result for a search target graphic handwritten by the user on another date may be browsed as in the above-described case by clicking the date displayed in the history region 509.

<4. Third Embodiment>

In the third embodiment of the present invention, attribute information of "graphic entry" is added to handwriting data. The attribute information of "graphic entry" indicates that "handwritten graphic is shaped." That is, the user performing handwriting by designating the attribute "graphic entry" is considered to desire to shape the handwritten graphic with the attribute when the handwriting data is input to the information processing device 300.

FIG. 15 is a diagram showing an example in which the user performs handwriting in the information processing system 10 according to the third embodiment of the present invention. For example, if the user desires to draw a circuit diagram, the user designates the attribute "graphic entry," and hand-writes a user-imaged circuit diagram as an attribute handwriting part 603.

Thereafter, if handwriting data is input to the information processing device 300, the circuit diagram drawn with the attribute "graphic entry" is recognized as a shaping target graphic 605.

It is not indispensable to designate the shaping target graphic 605 by handwriting with the attribute "graphic entry." Without designating the attribute, the handwritten graphic may be surrounded with a line handwritten with the attribute "graphic entry."

Figure 16:
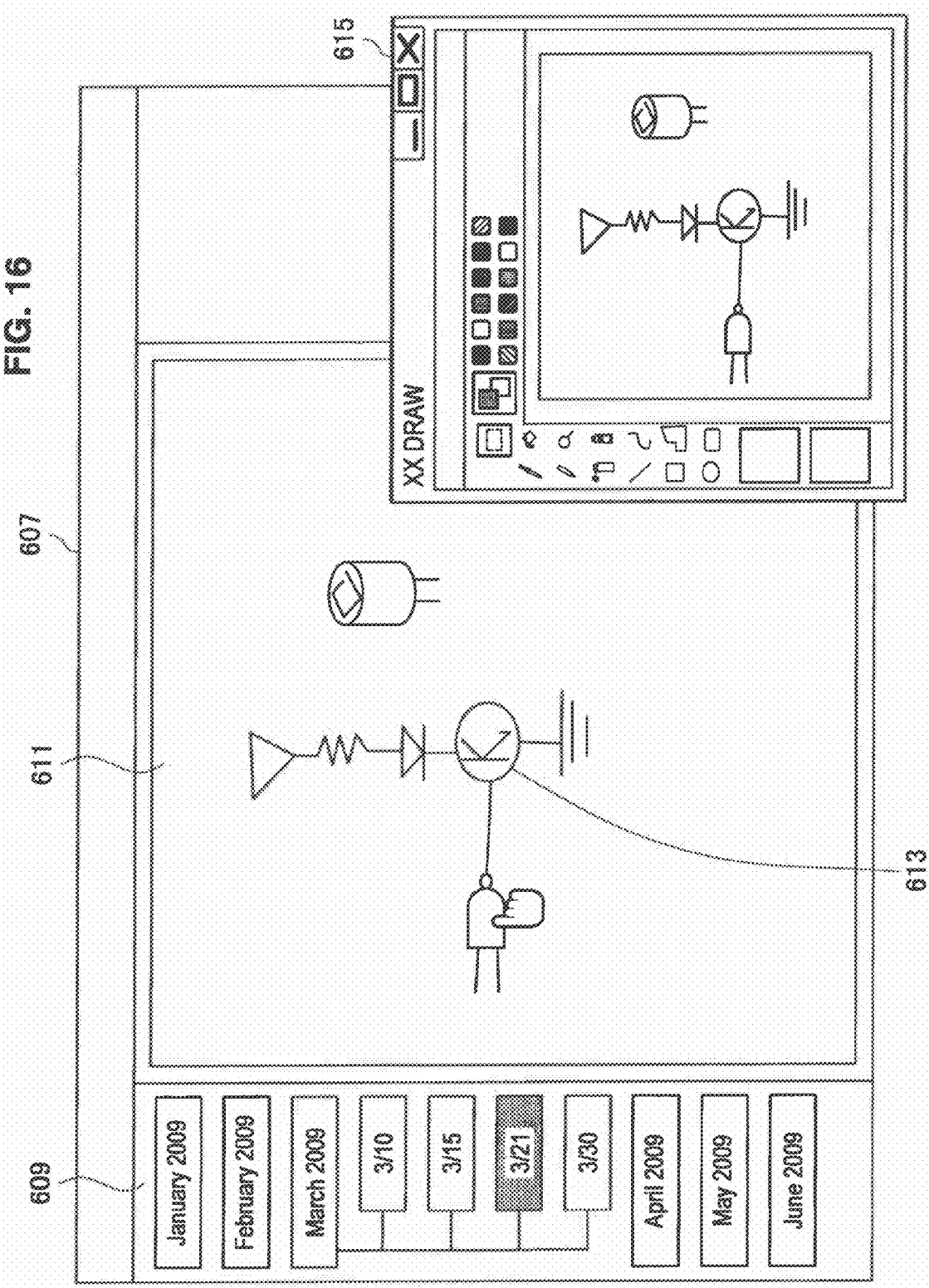
FIG. 16 is a diagram showing an example of a screen displayed by the information processing device according to the same embodiment.

FIG. 16 is a diagram showing an example of a screen displayed by the display unit 380 when handwriting data is input from the receiver 200 to the information processing device 300 in the third embodiment of the present invention. Here, an application window 607 includes a history region 609, a handwriting data display region 611, and the like.

In this case, the recognizing unit 350 of the information processing device 300 extracts a graphic recognized by handwriting data accompanied by the attribute "graphic entry" as the shaping target graphic.

Next, the search unit 360 appropriately cuts the shaping target graphic extracted by the recognizing unit 350 and searches for a graphic element for replacing each cut part.

Here, the graphic element is a predetermined type of element constituting a graphic such as a straight line, an arc, a quadratic curve, or the like. The search unit 360 cuts the shaping target graphic into appropriate elements and replaces each cut part with a searched graphic element so that the shaping target graphic can be accurately approximated as a set of graphic elements.

The converting unit 370 generates display data of a shaped graphic 613 by recombining graphic elements searched for by the search unit 360. In addition, the control unit 390 replaces a part of the shaping target graphic of the handwriting data display region 611 with the shaped graphic 613 generated by the converting unit 370, and displays the shaped graphic 613.

Here, if the shaped graphic 613 is clicked by the pointer, the control unit 390 causes the display unit 380 to further display an image edit application window 615 for editing the shaped graphic.

In addition, a search result for a search target graphic handwritten by the user on another date may be browsed as in the above-described case by clicking the date displayed in the history region 609.

<5. Fourth Embodiment>

In the fourth embodiment of the present invention, attribute information of "graphic entry" is added to handwriting data. The attribute information of "graphic entry" indicates that "image search processing is performed using a character string handwritten in a designated region as a keyword." That is, the user performing handwriting by designating the attribute "graphic entry" is considered to desire to search for an image by using the character string handwritten in the designated region as the keyword with the attribute when the handwriting data is input to the information processing device 300.

Figure 17:
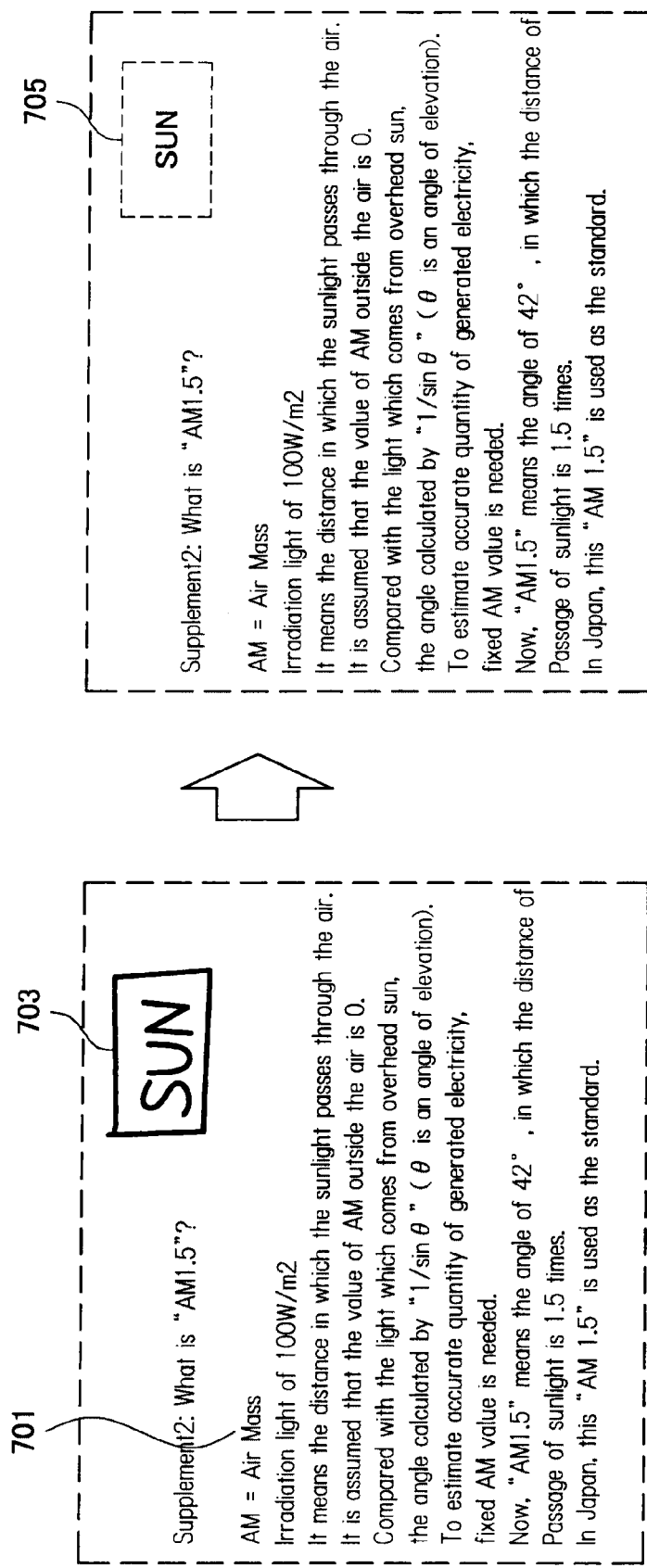
FIG. 17 is a diagram showing an example of handwriting performed by the user in the information processing system according to a fourth embodiment of the present invention.

FIG. 17 is a diagram showing an example in which the user performs handwriting in the information processing system 10 according to the fourth embodiment of the present invention. In general, the user performs handwriting without designating an attribute in a handwriting part 701.

Here, for example, if the user desires to render a searched image of the sun, the user hand-writes a region where the user desires to render an image as an attribute handwriting part 703 by designating the attribute "graphic entry." In addition, the user hand-writes a character string of "sun" in the region. In this character-string portion, handwriting may be performed with the attribute "graphic entry," or handwriting may be performed with other attributes or without an attribute. Thereafter, the user performs handwriting without again designating the attribute until the next position where the user desires to search for an image is found.

Thereafter, if handwriting data is input to the information processing device 300, a region drawn with the attribute "graphic entry" including the character string of "sun" is recognized as a search target region 705.

Figure 18:
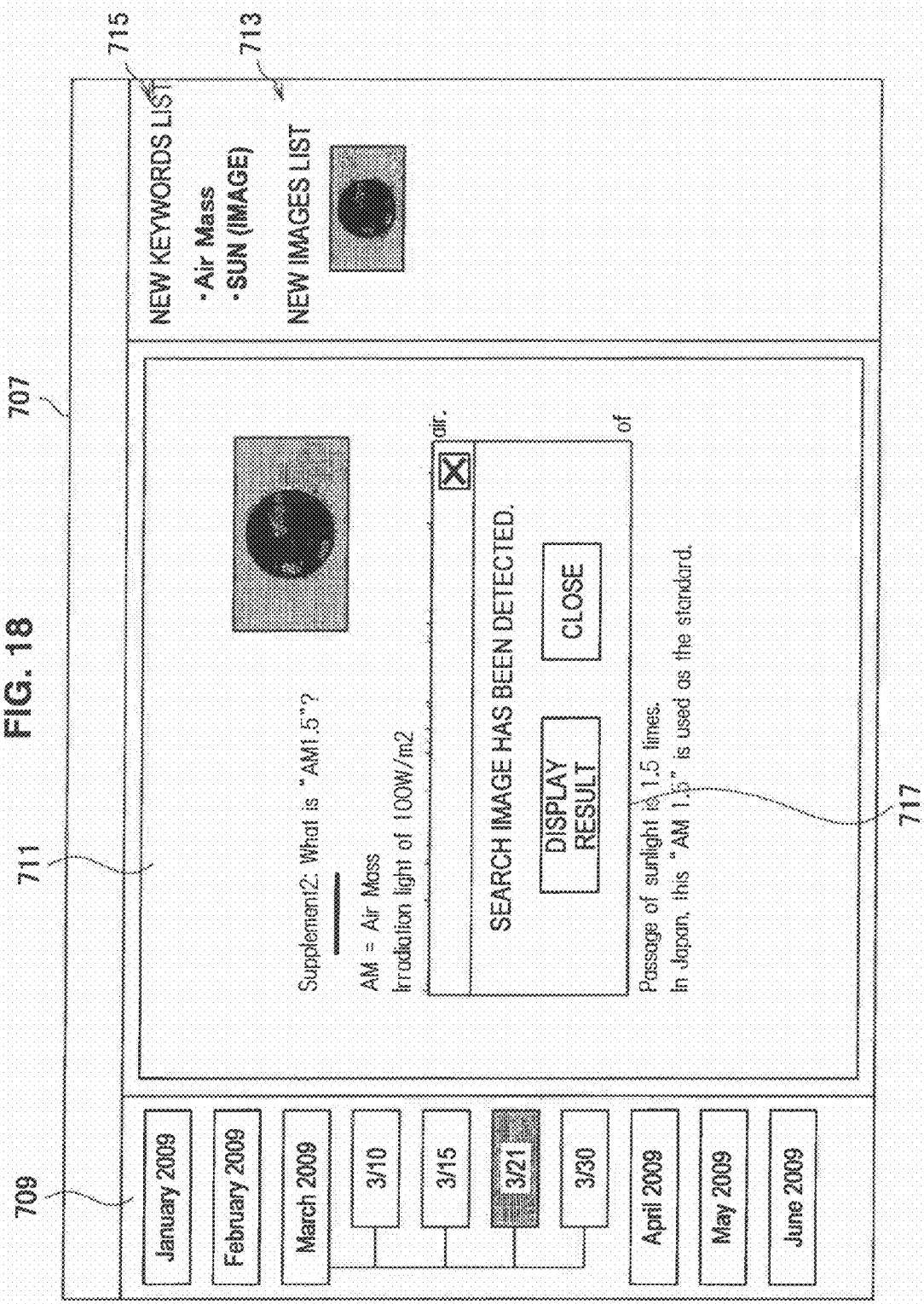
FIG. 18 is a diagram showing an example of a screen displayed by the information processing device according to the same embodiment.

FIG. 18 is a diagram showing an example of a screen displayed by the display unit 380 when handwriting data is input from the receiver 200 to the information processing device 300 in the fourth embodiment of the present invention. Here, an application window 707 includes a history region 709, a handwriting data display region 711, and the like.

In this case, the recognizing unit 350 of the information processing device 300 designates a graphic recognized by handwriting data accompanied by the attribute "graphic entry" as a search target region and recognizes a character string by performing the processing of OCR or the like for a part excluding the periphery of the search target region.

Next, the search unit 360 performs image search processing using the character string included in the search target region recognized by the recognizing unit 350 as the keyword. For example, the image search processing may be an Internet image search that is performed via the communication unit 330, or may be a local image search that searches for data of a file or the like stored in the storage unit 320.

The converting unit 370 generates display data of a search image list 713 by processing information of an image searched for by the search unit 360. For example, the converting unit 370 performs processing of generating a thumbnail of the searched image or adjusting a size in accordance with a display region. The control unit 390 causes the display unit 380 to further display the search image list 713 generated by the converting unit 370 and a dialog 717 for notifying the user of a result obtained by extracting a search target region and performing image search processing. In addition, the converting unit 370 may generate display data of the search keyword list 715 and the control unit 390 may cause the display unit 380 to display the search keyword list 715.

Figure 19:
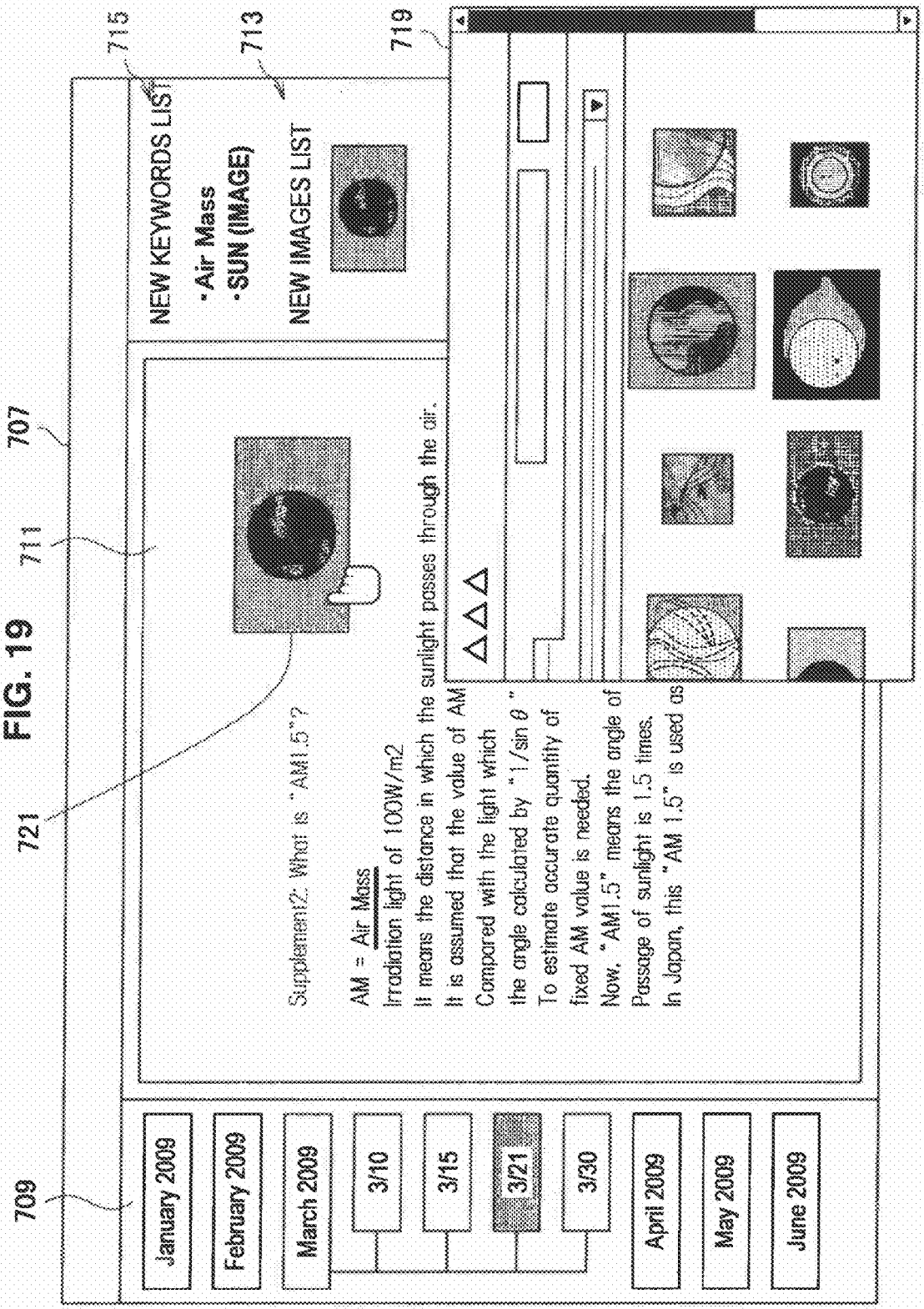
FIG. 19 is a diagram showing another example of a screen displayed by the information processing device according to the same embodiment.

FIG. 19 is a diagram showing another example of a screen in a state in which a "result display" button of the dialog 717 is pressed and a search result window 719 is displayed in the above-described case. The search result window 719 may be displayed if a corresponding image display part 721 of the handwriting data display region 711 or a corresponding image of the search image list 713 or the search keyword list 715 is clicked by the pointer.

Here, for example, if the Internet image search is performed by the search unit 360, the search result window 719 is a browser window in which an image group of a search result is displayed. If the local image search is performed by the search unit 360, the search result window 719 is an application window in which a searched image file is displayed.

In addition, a search result for a character string included in a search target region handwritten by the user on another date may be browsed as in the above-described case by clicking the date displayed in the history region 709.

<6. Fifth Embodiment>

In the fifth embodiment of the present invention, attribute information of "search keyword" or "graphic entry" is added to handwriting data. Here, the attribute information of "search keyword" indicates that "search processing is performed using a handwritten word as a keyword." The attribute information of "graphic entry" indicates that "similar-image search processing is performed for handwritten graphic" or that "handwritten graphic is shaped." The use performing handwriting appropriately selects and designates a desired one of the above-described two attribute information pieces.

Figure 20:
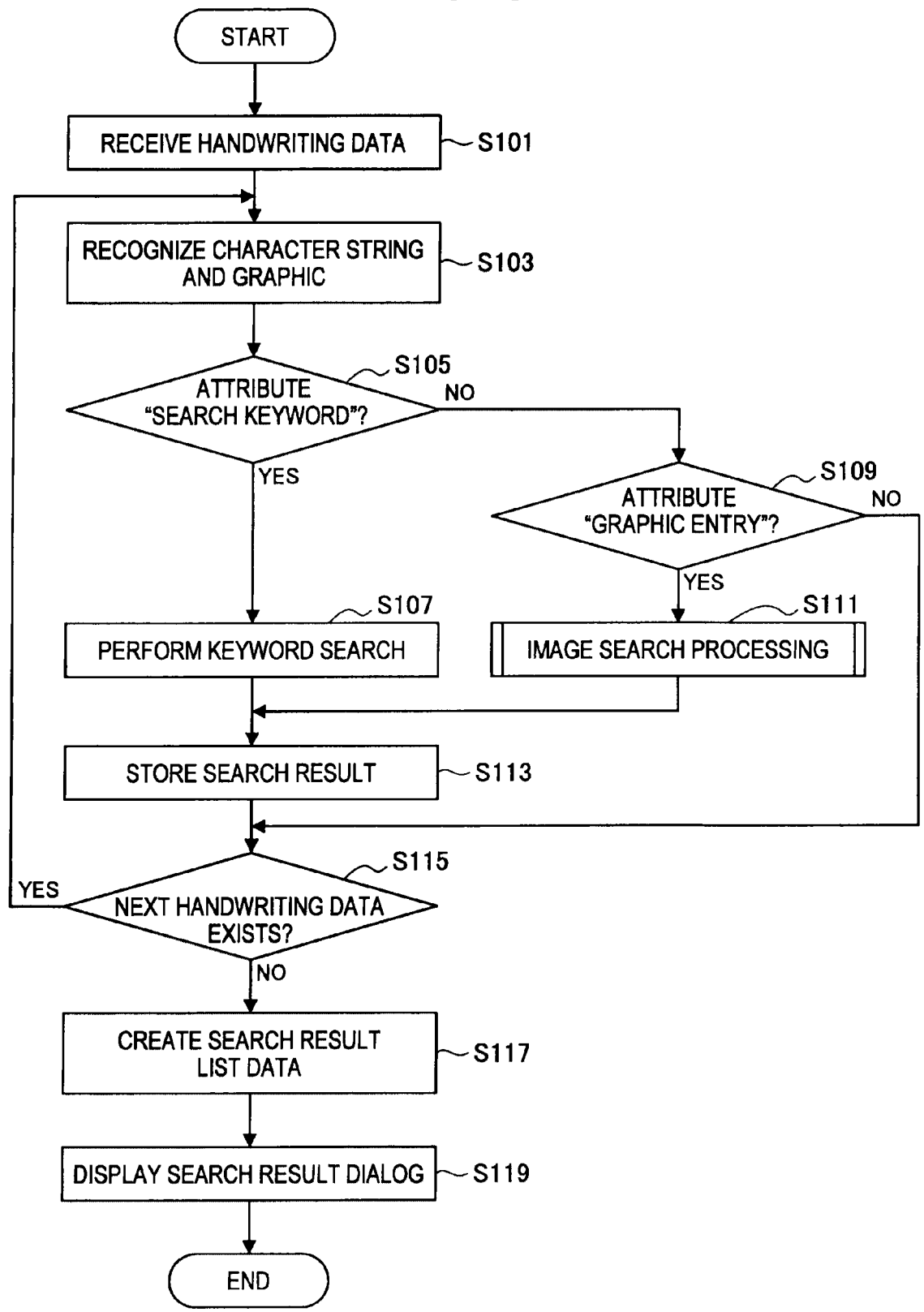
FIG. 20 is a flowchart showing processing of the information processing device according to a fifth embodiment of the present invention.

FIG. 20 is a flowchart showing processing of the information processing device 300 according to the fifth embodiment of the present invention. First, the receiving unit 310 receives handwriting data accompanied by attribute information from the receiver 200 (step S101). Next, the recognizing unit 350 recognizes a character string or a graphic from the handwriting data, and associates the attribute information accompanying the handwriting data with the character string or the graphic (step S103).

Here, if the character string recognized by the recognizing unit 350 is associated with an attribute "search keyword" (step S105), the control unit 390 causes the search unit 360 to perform search processing using the recognized character string as a search keyword (step S107).

On the other hand, if the graphic recognized by the recognizing unit 350 is associated with an attribute "graphic entry" (step S109), the search unit 360 or the like performs image search processing for a series of recognized graphics (step S111). The image search processing will be described later.

As described above, the search unit 360 searches for a type of information corresponding to a type of attribute information associated with the character string or the graphic.

If any search processing is performed by the search unit 360 above (step S107 or S111), the control unit 390 stores a search result of the search unit 360 in the storage unit 320 (step S113).

Here, if the next handwriting data to be recognized by the recognizing unit 350 is present (step S115), the recognizing unit 350 again recognizes handwriting data accompanied by attribute information (step S103).

If the next processing target is absent in step S115 described above, the control unit 390 creates data for displaying a character string list and a graphic list used for a search (step S117), and causes the display unit 380 to display a dialog for displaying the character string list and the graphic list used for the search and searched content (step S119).

Figure 21:
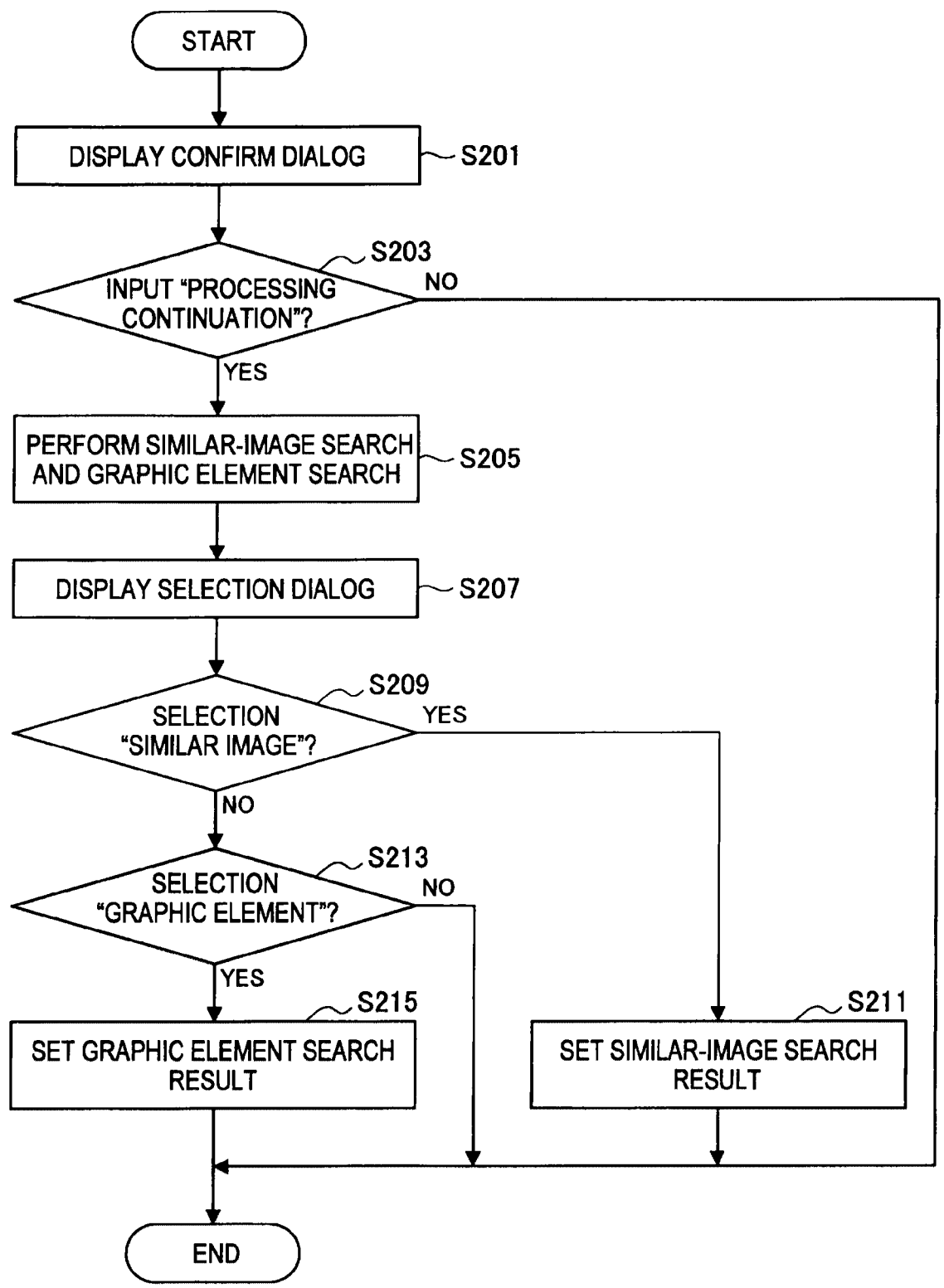
FIG. 21 is a flowchart showing image search processing during the processing of the information processing device according to the same embodiment.

FIG. 21 is a flowchart showing image search processing in processing of the information processing device 300 according to the fifth embodiment of the present invention. First, the control unit 390 causes the display unit 380 to display a confirm dialog for indicating that a graphic search processing target is recognized (step S201).

Here, if an instruction of the user to continue processing is acquired by the input unit 340 (step S203), the control unit 390 causes the search unit 360 to perform both of a similar-image search of a graphic recognized by the recognizing unit 350 and a graphic element search for replacing a graphic recognized by the recognizing unit 350 (step S205). In addition, the control unit 390 causes the display unit 380 to display a selection dialog including a part of the search result of the search unit 360 as a sample (step S207).

In addition, if an instruction of the user to desire to perform similar-image search processing is acquired by the input unit 340 (step S209), the control unit 390 sets a similar-image search result among search results of the search unit 360 to an image search result (step S211).

On the other hand, if an instruction of the user to perform graphic shaping processing is acquired by the input unit 340 (step S213), the control 390 sets a graphic element search result among search results of the search unit 360 to an image search result (step S215).

If an instruction of the user to close the dialog is acquired by the input unit 340 in the dialog displayed in step S201 or S205 described above, the control unit 390 terminates image search processing without causing the search unit 360 to perform search processing.

As a result, the search unit 360 searches for a type of information designated by the user's manipulation received in the input unit 340 by the above-described processing.

FIG. 22 is a diagram showing an example of a screen displayed by the display unit 380 in step S201 described above. Here, an application window 807 includes a history region 809, a handwriting data display region 811, and the like, and a confirm dialog 813 is displayed.

FIG. 23 is a diagram showing an example of a screen displayed by the display unit 380 in step S205 described above. A selection dialog 815 includes samples of a similar-image search and a graphic element searched for by the search unit 360, radio buttons for selecting any processing, and the like.

<7. Supplement>

It should be understood by those skilled in the art that various modifications, combinations, sub-combinations and alterations may occur depending on design requirements and other factors insofar as they are within the scope of the appended claims or the equivalents thereof.

An example in which the user designates an attribute of handwriting data by manipulating a switch provided on the electronic pen or receiver has been described in the above-described embodiment, but the present invention is not limited thereto. For example, if a specific shape of a symbol or the like is recognized even when handwriting is performed without designating an attribute, it may be determined that the attribute is designated therewith.

An example in which the search unit of the information processing device simply performs an Internet search, a local search, or the like has been described in the above-described embodiment, but the present invention is not limited thereto. For example, a search result close to the user's desired result may be preferentially displayed by preferentially searching for a dictionary service on the Internet in the Internet search or preferentially searching for a file created by a specific user in the local search.

The present application contains subject matter related to that disclosed in Japanese Priority Patent Application JP 2010-060869 filed in the Japan Patent Office on Mar. 17, 2010, the entire content of which is hereby incorporated by reference.

What is claimed is:

1. An information processing device comprising:
    circuitry configured to
        receive handwriting data and attribute information which is selected from a plurality of attribute information based on user operation,
        recognize a character string from the handwriting data associated with the attribute information and associate the attribute information and the recognized character string,
        search for pictorial image information on the basis of the recognized character string as a keyword, according to the attribute information associated with the recognized character string,
        generate display data including a plurality of pictorial images as a search result of pictorial image information related to the recognized character string from the handwriting data,
        display a dialog box indicating that the search result has been obtained,
        display, adjacent to the displayed dialog box, history information indicating previous searches performed in the past by the circuitry, and
        display, after displaying the dialog box and after displaying the history information indicating the previous searches performed in the past, the display data including the plurality of pictorial images as the search result in response to an input via the dialog box, which indicates that the search result has been obtained.

2. The information processing device according to claim 1, wherein when the handwriting data and the attribute information is received, the circuitry automatically recognizes the character string and associates the attribute information and the recognized character string.

3. The information processing device according to claim 1, wherein when the attribute information associated with the recognized character string exists, the circuitry automatically searches for the pictorial image information on the basis of the recognized character string as the keyword, according to the attribute information associated with the recognized character string.

4. The information processing device according to claim 1, further comprising:
an input device which receives manipulation of a user, wherein the input device receives the user operation selecting the attribute information.

5. The information processing device according to claim 1, wherein
the circuitry is configured to communicate with a network, and
the circuitry searches for the pictorial image information from information on the network.

6. The information processing device according to claim 1, further comprising:
a memory in which information is stored,
wherein the circuitry searches for the pictorial image information from the information stored in the memory.

7. The information processing device according to claim 1, wherein the recognized character string corresponds to text.

8. The information processing device according to claim 1, wherein the circuitry receives the handwriting data from an electronic pen.

9. The information processing device according to claim 1, wherein
the recognized character string corresponds to text, and
at least one of the plurality of pictorial images corresponds to a pictorial representation of the text.

10. The information processing device according to claim 1, wherein
the circuitry is configured to
display the history information by date, and
display a previous search result performed on a particular date in the past, in response to a selection of the particular date.

11. The information processing device according to claim 1, wherein the circuitry is configured to display the display data including the plurality of pictorial images as the search result in a pop-up window that is different from the dialog box and a display area of the history information.

12. An information processing system comprising:
an electronic pen configured to transmit handwriting data;
a receiver configured to receive the handwriting data and transmit the handwriting data and attribute information which is selected from a plurality of attribute information based on user operation; and
an information processing device including circuitry configured to
receive the handwriting data and the attribute information,
recognize a character string from the handwriting associated with the attribute information and associate the attribute information and the recognized character string
search for pictorial image information on the basis of the recognized character string as a keyword, according to the attribute information associated with the recognized character string,
generate display data including a plurality of pictorial images as a search result of pictorial image information related to the recognized character string from the handwriting data,
display a dialog box indicating that the search result has been obtained,
display, adjacent to the displayed dialog box, history information indicating previous searches performed in the past by the circuitry, and
display, after displaying the dialog box and after displaying the history information indicating the previous searches performed in the past, the display data including the plurality of pictorial images as the search result in response to an input via the dialog box, which indicates that the search result has been obtained.

13. A non-transitory computer readable recording medium storing a program, which when executed by a computer, causes the computer to execute the steps of:
receiving handwriting data of an electronic pen and attribute information which is selected from a plurality of attribute information based on user operation;
recognizing a character string from the handwriting data associated with the attribute information and associating the attribute information and the recognized character string;
searching for pictorial image information on the basis of the recognized character string as a keyword, according to the attribute information associated with the recognized character string;
generating display data including a plurality of pictorial images as a search result of pictorial image information related to the recognized character string from the handwriting data;
displaying a dialog box indicating that the search result has been obtained;
displaying, adjacent to the displayed dialog box, history information indicating previous searches performed in the past by the searching; and
displaying, after the displaying of the dialog box and after the displaying of the history information indicating the previous searches performed in the past, the display data including the plurality of pictorial images as the search result in response to an input via the dialog box, which indicates that the search result has been obtained.

14. A method comprising:
receiving handwriting data and attribute information which is selected from a plurality of attribute information based on user operation;
recognizing a character string from the handwriting data associated with the attribute information and associating the attribute information and the recognized character string;
searching, using processing circuitry of an apparatus, for pictorial image information on the basis of the recognized character string as a keyword, according to the attribute information associated with the recognized character string;
generating, using the processing circuitry, display data including a plurality of pictorial images as a search result of pictorial image information related to the recognized character string from the handwriting data;
displaying, using the processing circuitry, a dialog box indicating that the search result has been obtained;
displaying, using the processing circuitry, adjacent to the displayed dialog box, history information indicating previous searches performed in the past by the searching; and displaying, using the processing circuitry, after the displaying of the dialog box and after the displaying of the history information indicating the previous searches performed in the past, the display data including the plurality of pictorial images as the search result in response to an input via the dialog box, which indicates that the search result has been obtained.

\* \* \* \* \*